US012508510B2

(12) United States Patent
Demura et al.

(10) Patent No.: US 12,508,510 B2
(45) Date of Patent: Dec. 30, 2025

(54) STORAGE MEDIUM, GAME SYSTEM, GAME APPARATUS, AND GAME PROCESSING METHOD

(71) Applicant: NINTENDO CO., LTD., Kyoto (JP)

(72) Inventors: Yuji Demura, Kyoto (JP); Takahiro Takayama, Kyoto (JP); Naoki Fukada, Kyoto (JP); Kazuhiro Kawamura, Kyoto (JP)

(73) Assignee: Nintendo Co., Ltd., Kyoto (JP)

(*) Notice: Subject to any disclaimer, the term of this patent is extended or adjusted under 35 U.S.C. 154(b) by 283 days.

(21) Appl. No.: 18/521,177

(22) Filed: Nov. 28, 2023

(65) Prior Publication Data

US 2024/0359102 A1 Oct. 31, 2024

(30) Foreign Application Priority Data

Apr. 27, 2023 (JP) ................................ 2023-073421

(51) Int. Cl.
*A63F 13/57* (2014.01)

(52) U.S. Cl.
CPC .................................... *A63F 13/57* (2014.09)

(58) Field of Classification Search
CPC .......... A63F 13/25; A63F 13/40; A63F 13/42; A63F 13/45; A63F 13/50; A63F 13/52; A63F 13/56; A63F 13/57; A63F 13/573; A63F 13/577; A63F 2300/64; A63F 2300/646
See application file for complete search history.

(56) References Cited

U.S. PATENT DOCUMENTS

| | | | | |
|---|---|---|---|---|
| 8,771,072 | B2 * | 7/2014 | Dohta | A63F 13/56 463/31 |
| 2015/0080123 | A1 * | 3/2015 | Motokura | A63F 13/847 463/31 |
| 2017/0193706 | A1 * | 7/2017 | Lo | G06T 19/006 |
| 2021/0370178 | A1 * | 12/2021 | Fukada | A63F 13/57 |

FOREIGN PATENT DOCUMENTS

| | | |
|---|---|---|
| JP | 2014-033909 | 2/2014 |
| JP | 2021-186373 | 12/2021 |

OTHER PUBLICATIONS

"The Legend of Zelda: Breath of the Wild", Features, By land, sea, and air, [online], Nintendo of America Inc., searched on Mar. 31, 2023, internet URL: https://www.zelda.com/breath-of-the-wild/features/#!/bylandseaandair.

* cited by examiner

*Primary Examiner* — Omkar A Deodhar
(74) *Attorney, Agent, or Firm* — Nixon & Vanderhye PC

(57) ABSTRACT

For at least one floating object disposed in the air, of dynamic objects disposed in a virtual space, movements of the dynamic objects being controlled based on physical calculation, a load applied to the floating object is calculated based on a game process. In a first case in which the load does not exceed a first limit load in a first direction including at least a downward direction in the virtual space, a first force that maintains a position of the floating object in the virtual space, is additionally applied to the floating object. In a second case in which the load exceeds the first limit load in the first direction, the first force is removed. The position and an orientation of the floating object are updated based on the physical calculation.

20 Claims, 25 Drawing Sheets

STORAGE MEDIUM, GAME SYSTEM, GAME APPARATUS, AND GAME PROCESSING METHOD

CROSS REFERENCE TO RELATED APPLICATIONS

This application claims priority to Japanese Patent Application No. 2023-073421, filed on Apr. 27, 2023, the entire contents of which are incorporated herein by reference.

FIELD

The technology disclosed herein relates to a storage medium, game system, game apparatus, and game processing method that execute a process using an object in a virtual space.

BACKGROUND AND SUMMARY

There has been conventionally a game program that uses an object in a virtual space. For example, the game program provides a game in which a player character can glide and jump in the air of the virtual space.

However, there is room for an increase in what can be performed in the air in the game provided by the game program.

With the above in mind, it is an object of the present example to provide a storage medium, game system, game apparatus, and game processing method in which what can be performed in the air of a virtual space can be increased.

To this end, the present example may have the following features (1) to (8), for example.

(1) A non-transitory computer-readable storage medium according to the present example has stored therein instructions that, when executed, cause one or more processors of an information processing apparatus to execute game processing comprising: for at least one floating object disposed in the air, of dynamic objects disposed in a virtual space, movements of the dynamic objects being controlled based on physical calculation, calculating a load applied to the floating object based on a game process: in a first case in which the load does not exceed a first limit load in a first direction including at least a downward direction in the virtual space, additionally applying a first force that maintains a position of the floating object in the virtual space, to the floating object: in a second case in which the load exceeds the first limit load in the first direction, removing the first force: and updating the position and an orientation of the floating object based on the physical calculation.

With the configuration of (1), a floating object can be implemented that acts to remain at a position in the air of the virtual space when a load that does not exceed the first limit load is applied thereto, and can also be moved from the position.

(2) In the configuration of (1), the game processing may further comprise: storing the position and orientation of the floating object updated based on the physical calculation: and in the first case, applying a force that returns the floating object from the position and orientation of the floating object that are taken when the floating object is moved based on the load without the first force being applied to the floating object to the immediately previously stored position and orientation, as the first force, to the floating object.

With the configuration of (2), a force that returns a floating object to the immediately previous position and orientation stored is applied to the floating object, and therefore, the floating object can be prevented from being moved due to a load applied thereto.

(3) In the configuration of (1) or (2), the first direction may be a vertical direction in the virtual space.

With the configuration of (3), the floating object can be moved upward in the virtual space.

(4) In the configuration of (3), the first force may maintain a position of the floating object related to the vertical direction.

With the configuration of (4), the floating object can act to remain at a position in the air of the virtual space even when an upward load is applied thereto, and can also be moved upward in the virtual space.

(5) In the configuration of any one of (1) to (4), the game processing may further comprise: in a third case in which the load does not exceed a second limit load in a second direction along a horizontal direction in the virtual space, additionally applying a second force that maintains a position of the floating object related to the horizontal direction in the virtual space, to the floating object: and in a fourth case in which the load exceeds the second limit load in the second direction, removing the second force.

With the configuration of (5), different limit loads are set in the vertical direction and the horizontal direction, and the floating object is caused to act to remain at a position in each of the vertical and horizontal directions. Therefore, the situation in which when the limit load is exceeded in one of the directions, the floating object is also moved in the other direction can be avoided, and movement in the vertical direction and movement in the horizontal direction can be controlled separately.

(6) In the configuration of any one of (1) to (5), the load may include a load in a gravitational direction of the virtual space based on a weight of the dynamic object placed on the floating object based on the game process, and a thrust applied to the floating object based on contact from the dynamic object that produces a thrust in a direction.

With the configuration of (6), the floating object can be moved using a thrust.

(7) In the configuration of (6), the game processing may further comprise: controlling a player character in the virtual space based on an operation input. The load may include a load in the gravitational direction based on a weight of the player character when the player character is placed on the floating object.

With the configuration of (7), the player character can stay in the air with the player character placed on the floating object, or can move in the air floating object with the player character placed on the floating object.

(8) In the configuration of any one of (1) to (7), the game processing may further comprise: when the floating object moves based on the physical calculation, producing a force that attenuates a movement speed of the movement to control the movement speed of the floating object.

With the configuration of (8), a scene can be performed in which, by attenuating the movement speed of the floating object during movement of the floating object, the movement of the floating object in the air can be slowed, so that it seems that the floating object is trying to remain at a position even during the movement.

In addition, the present example may be carried out in the forms of a game system, game apparatus, and game processing method.

According to the present example, a floating object can be implemented that acts to remain at a position in the air of a virtual space when a load that does not exceed a limit load is applied thereto, and can also be moved from the position.

These and other objects, features, aspects and advantages of the present exemplary embodiment will become more apparent from the following detailed description of the present exemplary embodiment when taken in conjunction with the accompanying drawings.

DETAILED DESCRIPTION OF NON-LIMITING EXAMPLE EMBODIMENTS

A game system according to the present example will now be described. An example of a game system 1 according to the present example includes a main body apparatus (information processing apparatus serving as the main body of a game apparatus in the present example) 2, a left controller 3, and a right controller 4. The left controller 3 and the right controller 4 are attachable to and detachable from the main body apparatus 2. That is, the user can attach the left controller 3 and the right controller 4 to the main body apparatus 2, and use them as a unified apparatus. The user can also use the main body apparatus 2 and the left controller 3 and the right controller 4 separately from each other (see FIG. 2). In the following description, a hardware configuration of the game system 1 of the present example is described, and thereafter, the control of the game system 1 of the present example is described.

Figure 1:
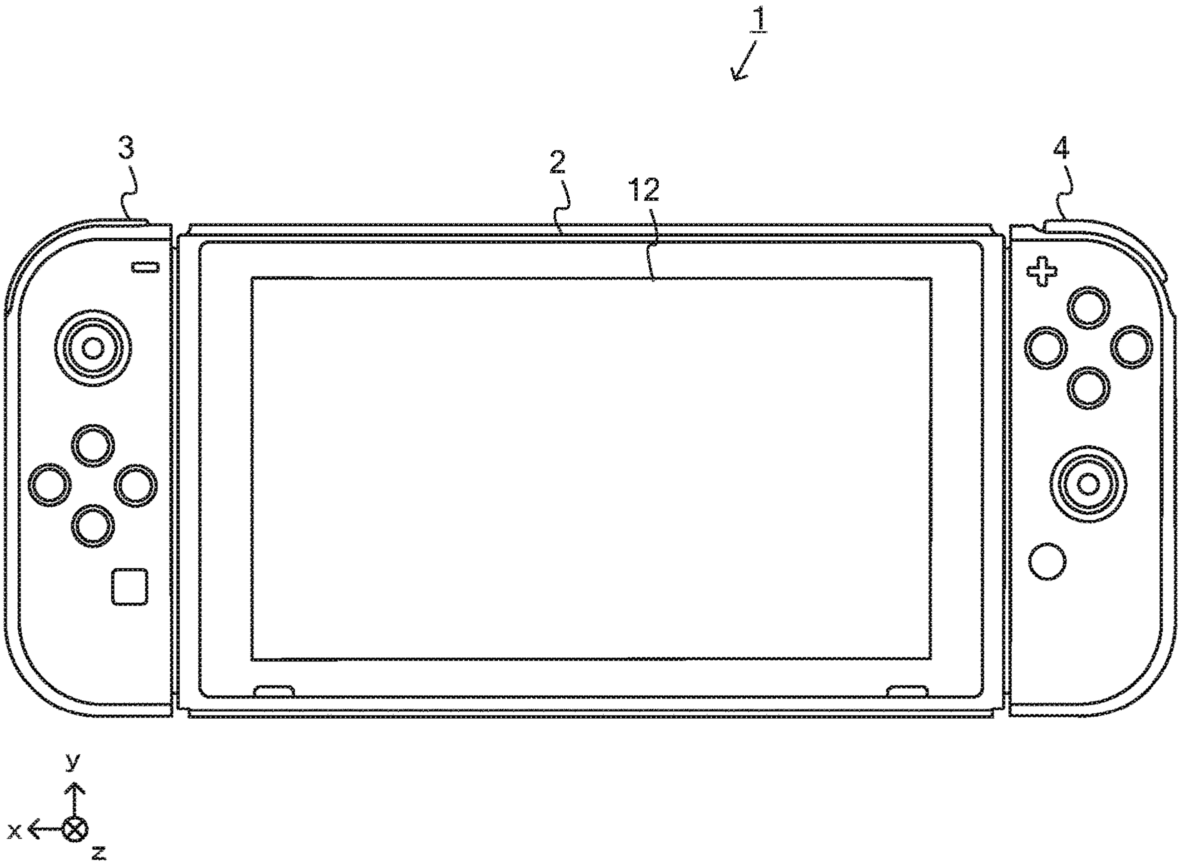
FIG. 1 is a diagram illustrating a non-limiting example of a state in which a left controller 3 and a right controller 4 are attached to a main body apparatus 2.

FIG. 1 is a diagram illustrating an example of a state in which the left controller 3 and the right controller 4 are attached to the main body apparatus 2. As illustrated in FIG. 1, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

Figure 2:
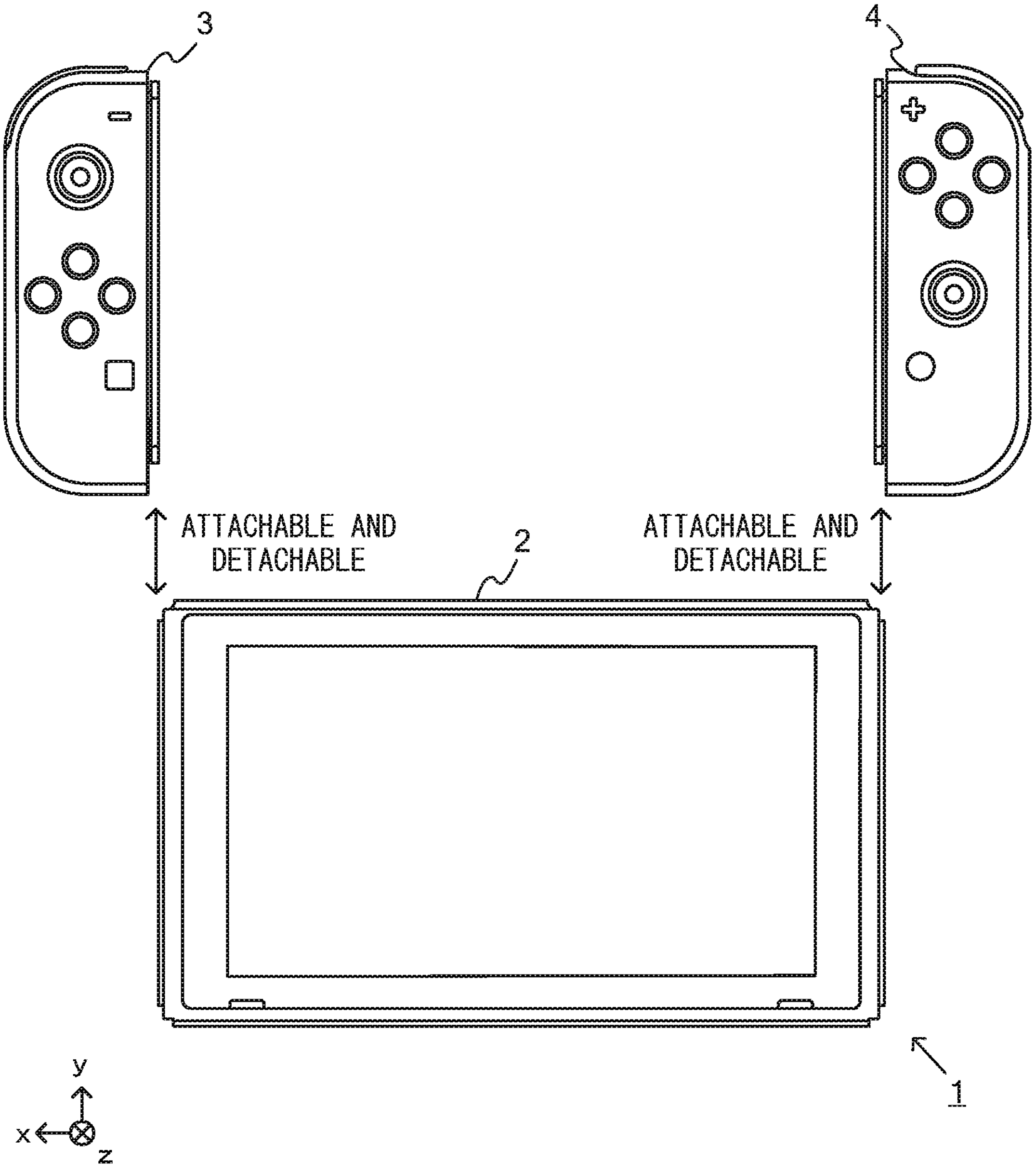
FIG. 2 is a diagram illustrating a non-limiting example of a state in which a left controller 3 and a right controller 4 are detached from a main body apparatus 2.

FIG. 2 is a diagram illustrating an example of a state in which each of the left controller 3 and the right controller 4 is detached from the main body apparatus 2. As illustrated in FIGS. 1 and 2, the left controller 3 and the right controller 4 are attachable to and detachable from the main body apparatus 2. It should be noted that hereinafter, the left controller 3 and the right controller 4 will occasionally be referred to collectively as a "controller".

Figure 3:
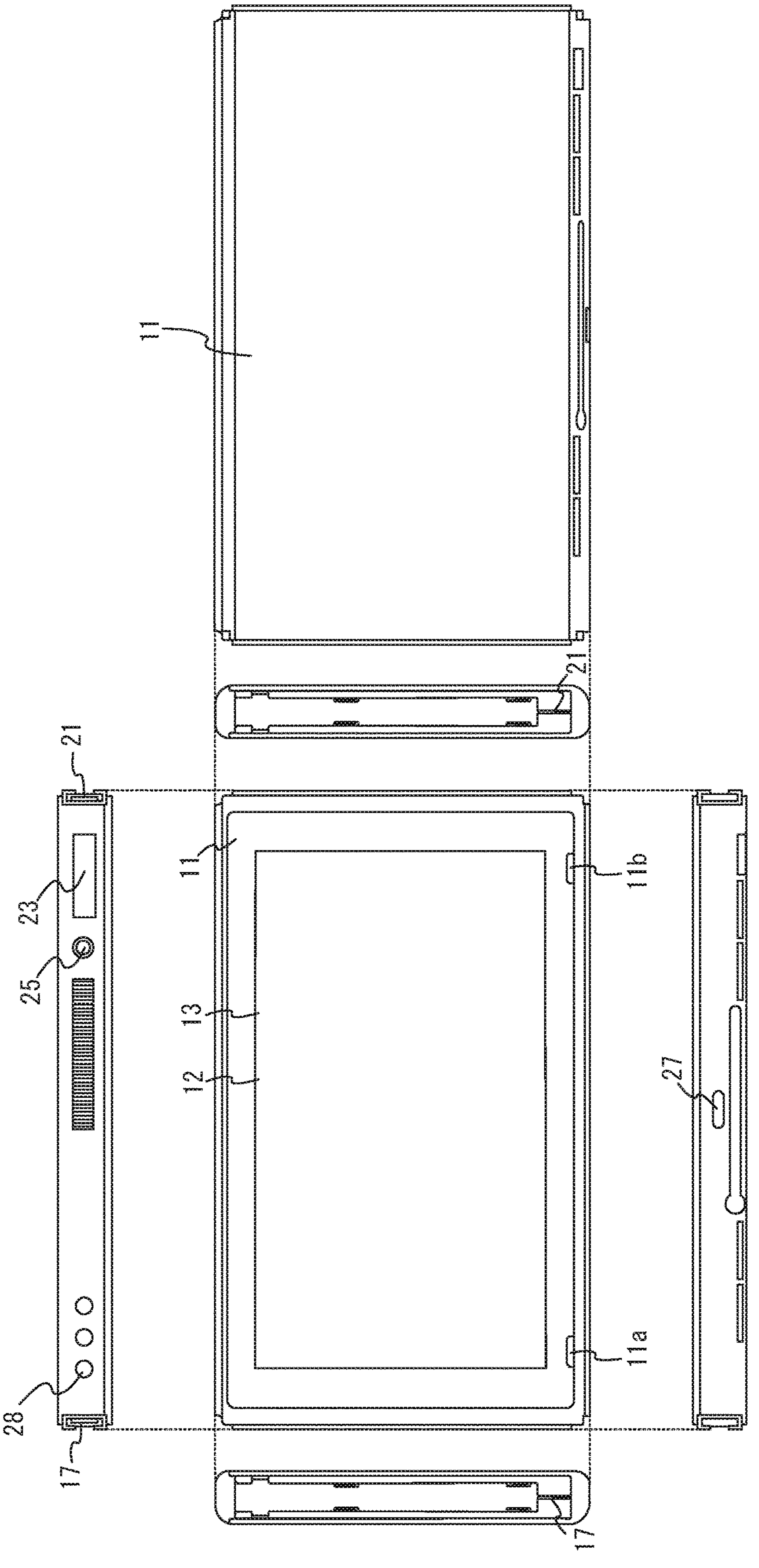
FIG. 3 illustrates six orthogonal views of a non-limiting example of a main body apparatus 2.

FIG. 3 illustrates six orthogonal views of an example of the main body apparatus 2. As illustrated in FIG. 3, the main body apparatus 2 includes an approximately plate-shaped housing 11. In the present example, a main surface (in other words, a surface on a front side, i.e., a surface on which the display 12 is provided) of the housing 11 has a generally rectangular shape.

It should be noted that the shape and the size of the housing 11 are optional. As an example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As illustrated in FIG. 3, the main body apparatus 2 includes the display 12, which is provided on the main surface of the housing 11. The display 12 displays an image generated by the main body apparatus 2. In the present example, the display 12 is a liquid crystal display device (LCD). The display 12, however, may be a display device of any suitable type.

In addition, the main body apparatus 2 includes a touch panel 13 on the screen of the display 12. In the present example, the touch panel 13 allows multi-touch input (e.g., a capacitive touch panel). It should be noted that the touch panel 13 may be of any suitable type, e.g., it allows single-touch input (e.g., a resistive touch panel).

The main body apparatus 2 includes a speaker (i.e., a speaker 88 illustrated in FIG. 6) inside the housing 11. As illustrated in FIG. 3, speaker holes 11*a* and 11*b* are formed in the main surface of the housing 11. The speaker 88 outputs sounds through the speaker holes 11*a* and 11*b*.

The main body apparatus 2 also includes a left-side terminal 17 that enables wired communication between the main body apparatus 2 and the left controller 3, and a right-side terminal 21 that enables wired communication between the main body apparatus 2 and the right controller 4.

As illustrated in FIG. 3, the main body apparatus 2 includes a slot 23. The slot 23 is provided on an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

The main body apparatus 2 includes a lower-side terminal 27. The lower-side terminal 27 allows the main body apparatus 2 to communicate with a cradle. In the present example, the lower-side terminal 27 is a USB connector (more specifically, a female connector). When the unified apparatus or the main body apparatus 2 alone is placed on the cradle, the game system 1 can display, on a stationary monitor, an image that is generated and output by the main body apparatus 2. Also, in the present example, the cradle has the function of charging the unified apparatus or the main body apparatus 2 alone, being placed thereon. The cradle also functions as a hub device (specifically, a USB hub).

Figure 4:
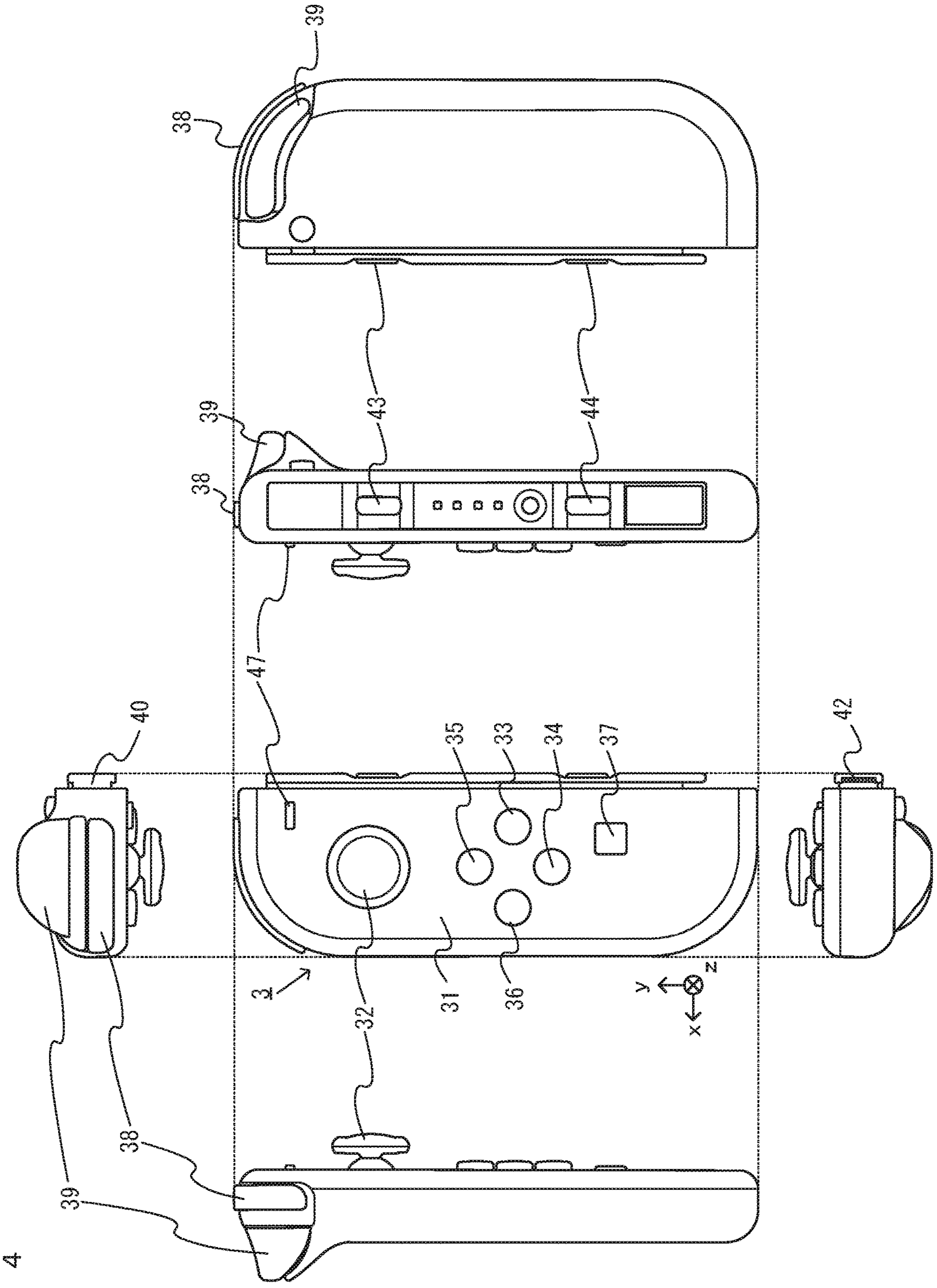
FIG. 4 illustrates six orthogonal views of a non-limiting example of a left controller 3.

FIG. 4 illustrates six orthogonal views of an example of the left controller 3. As illustrated in FIG. 4, the left controller 3 includes a housing 31. In the present example, the housing 31 has a vertically long shape, e.g., is shaped to be long in an up-down direction (i.e., a y-axis direction illustrated in FIGS. 1 and 4). In the state in which the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly the left hand. Further, the left controller 3 can also be held in the orientation in which the left controller 3 is horizontally long. When held in the orientation in which the left controller 3 is horizontally long, the left controller 3 may be held with both hands.

The left controller 3 includes an analog stick 32. As illustrated in FIG. 4, the analog stick 32 is provided on a main surface of the housing 31. The analog stick 32 can be used as a direction input section with which a direction can be input. The user tilts the analog stick 32 and thereby can input a direction corresponding to the direction of the tilt (and input a magnitude corresponding to the angle of the tilt). It should be noted that the left controller 3 may include a directional pad, a slide stick that allows a slide input, or the like as the direction input section, instead of the analog stick. Further, in the present example, it is possible to provide an input by pressing the analog stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "–" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give commands depending on various programs (e.g., an OS program and an application program) executed by the main body apparatus 2.

The left controller 3 also includes a terminal 42 that enables wired communication between the left controller 3 and the main body apparatus 2.

Figure 5:
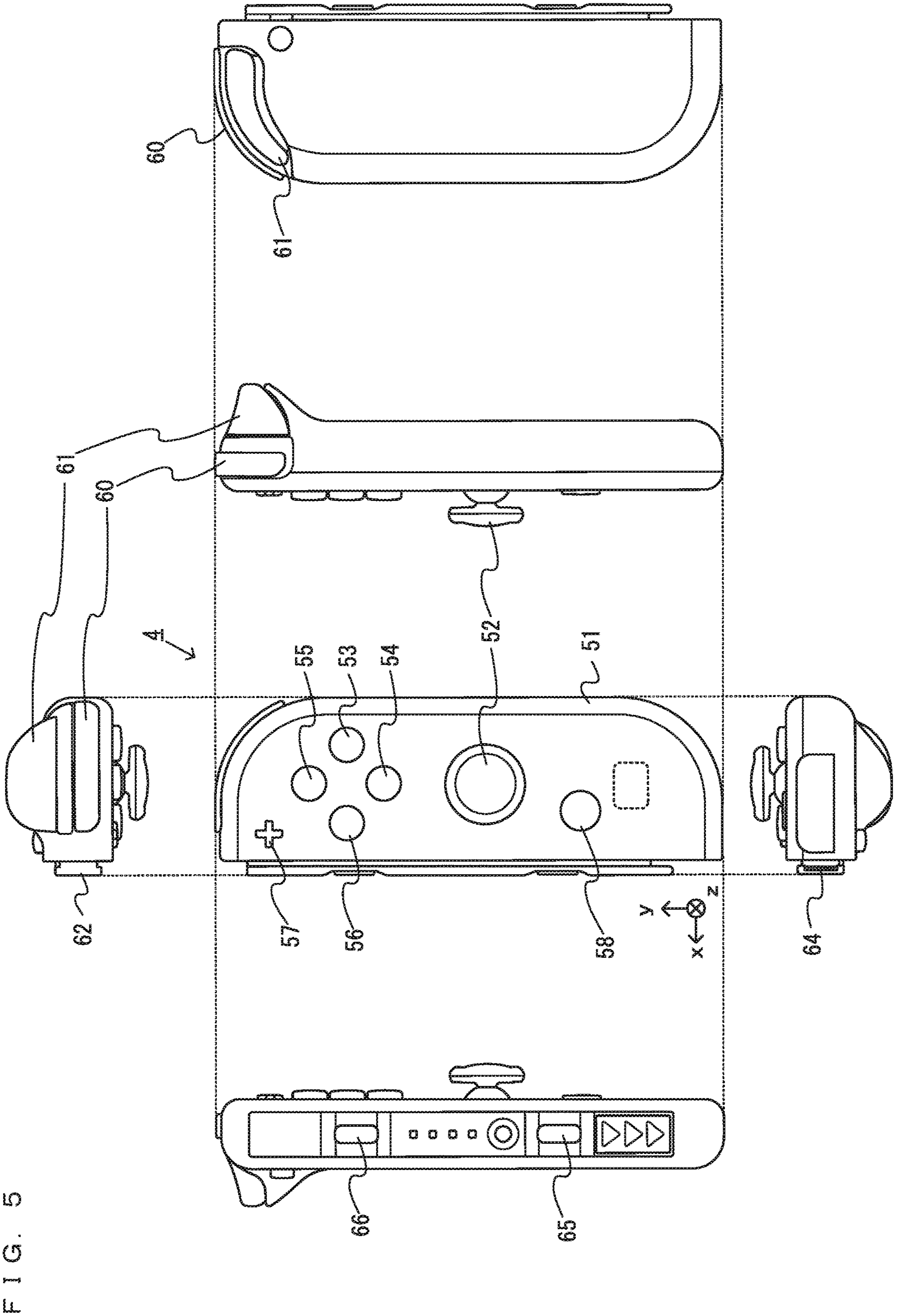
FIG. 5 illustrates six orthogonal views of a non-limiting example of a right controller 4.

FIG. 5 illustrates six orthogonal views of an example of the right controller 4. As illustrated in FIG. 5, the right controller 4 includes a housing 51. In the present example, the housing 51 has a vertically long shape, e.g., is shaped to be long in the up-down direction. In the state in which the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes an analog stick 52 as a direction input section. In the present example, the analog stick 52 has the same configuration as that of the analog stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

Further, the right controller 4 includes a terminal 64 for allowing the right controller 4 to perform wired communication with the main body apparatus 2.

Figure 6:
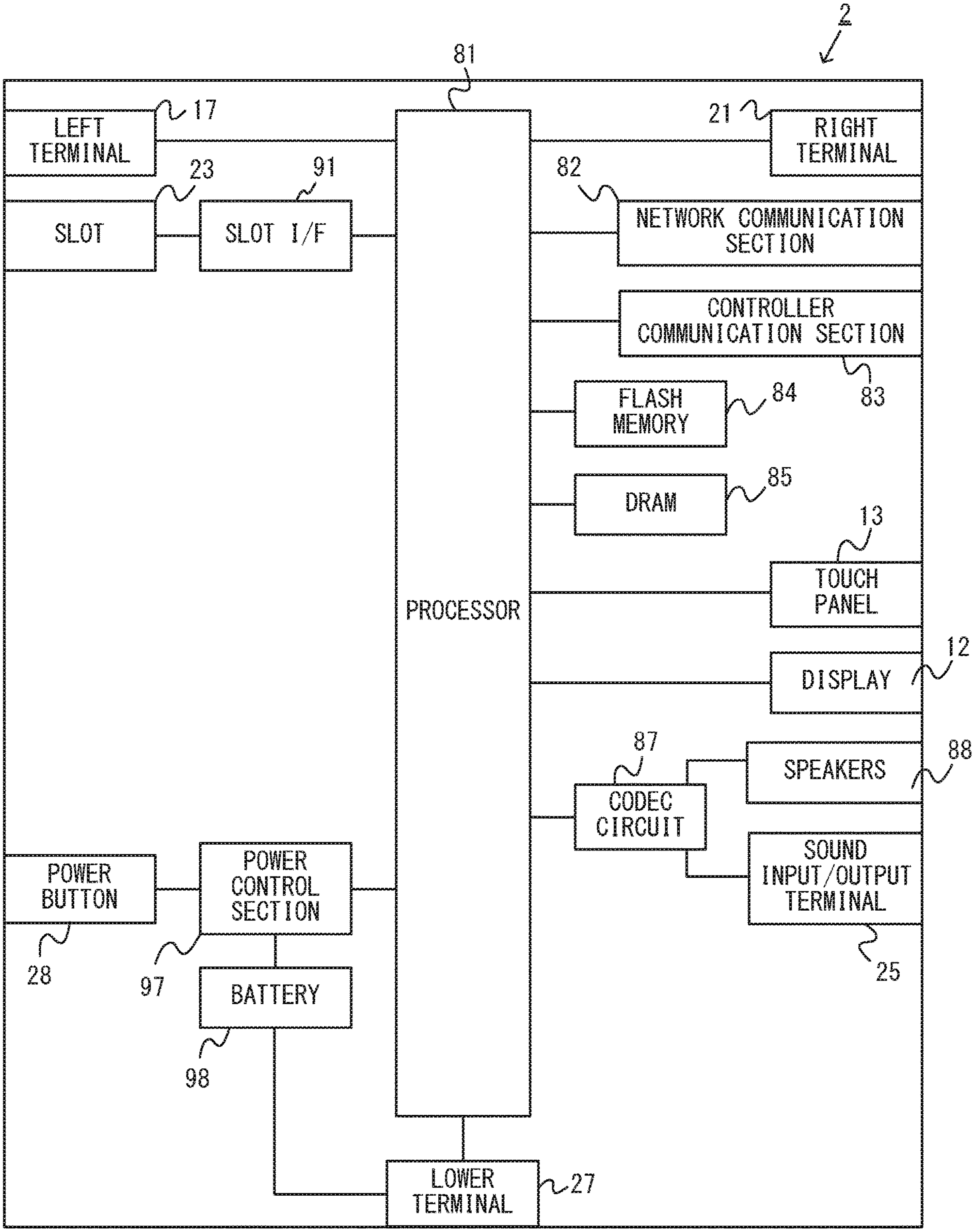
FIG. 6 is a block diagram illustrating a non-limiting example of an internal configuration of a main body apparatus 2.

FIG. 6 is a block diagram illustrating an example of an internal configuration of the main body apparatus 2. The main body apparatus 2 includes components 81 to 91, 97, and 98 illustrated in FIG. 6 in addition to the components illustrated in FIG. 3. Some of the components 81 to 91, 97, and 98 may be implemented as electronic parts on an electronic circuit board, which is contained in the housing 11.

The main body apparatus 2 includes a processor 81. The processor 81 is an information processor for executing various types of information processing to be executed by the main body apparatus 2. For example, the CPU 81 may include only a central processing unit (CPU), or may be a system-on-a-chip (SoC) having a plurality of functions such as a CPU function and a graphics processing unit (GPU) function. The processor 81 executes an information processing program (e.g., a game program) stored in a storage section (specifically, an internal storage medium such as a flash memory 84, an external storage medium that is attached to the slot 23, or the like), thereby executing the various types of information processing.

The main body apparatus 2 includes a flash memory 84 and a dynamic random access memory (DRAM) 85 as examples of internal storage media built in itself. The flash memory 84 and the DRAM 85 are connected to the CPU 81. The flash memory 84 is mainly used to store various data (or programs) to be saved in the main body apparatus 2. The DRAM 85 is used to temporarily store various data used in information processing.

The main body apparatus 2 includes a slot interface (hereinafter abbreviated to "I/F") 91. The slot I/F 91 is connected to the processor 81. The slot I/F 91 is connected to the slot 23, and reads and writes data from and to a predetermined type of storage medium (e.g., a dedicated memory card) attached to the slot 23, in accordance with commands from the processor 81.

The processor 81 reads and writes, as appropriate, data from and to the flash memory 84, the DRAM 85, and each of the above storage media, thereby executing the above information processing.

The main body apparatus 2 includes a network communication section 82. The network communication section 82 is connected to the processor 81. The network communication section 82 communicates (specifically, through wireless communication) with an external apparatus via a network. In the present example, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined communication method (e.g., communication based on a particular protocol or infrared light communication). It should be noted that the wireless communication in the above second communication form achieves the function of allowing so-called "local communication", in which the main body apparatus 2 can wirelessly communicate with another main body apparatus 2 located in a closed local network area, and the plurality of main body apparatuses 2 directly communicate with each other to exchange data.

The main body apparatus 2 includes a controller communication section 83. The controller communication section 83 is connected to the processor 81. The controller communication section 83 wirelessly communicates with the left controller 3 and/or the right controller 4. The main body apparatus 2 may communicate with the left and right controllers 3 and 4 using any suitable communication method. In the present example, the controller communication section 83 performs communication with the left and right controllers 3 and 4 in accordance with the Bluetooth (registered trademark) standard.

The processor 81 is connected to the left-side terminal 17, the right-side terminal 21, and the lower-side terminal 27. When performing wired communication with the left controller 3, the processor 81 transmits data to the left controller 3 via the left-side terminal 17 and also receives operation data from the left controller 3 via the left-side terminal 17. Further, when performing wired communication with the right controller 4, the processor 81 transmits data to the right controller 4 via the right-side terminal 21 and also receives operation data from the right controller 4 via the right-side terminal 21. Further, when communicating with the cradle, the processor 81 transmits data to the cradle via the lower-side terminal 27. As described above, in the present example, the main body apparatus 2 can perform both wired communication and wireless communication with each of the left and right controllers 3 and 4. Further, when the unified apparatus obtained by attaching the left and right controllers 3 and 4 to the main body apparatus 2 or the main body apparatus 2 alone is attached to the cradle, the main body apparatus 2 can output data (e.g., image data or sound data) to a stationary monitor or the like via the cradle.

Here, the main body apparatus 2 can communicate with a plurality of left controllers 3 simultaneously (or in parallel). Further, the main body apparatus 2 can communicate with a plurality of right controllers 4 simultaneously (or in parallel). Thus, a plurality of users can simultaneously provide inputs to the main body apparatus 2, each using a set of left and right controllers 3 and 4. As an example, a first user can provide an input to the main body apparatus 2 using a first set of left and right controllers 3 and 4, and at the same time, a second user can provide an input to the main body apparatus 2 using a second set of left and right controllers 3 and 4.

Further, the display 12 is connected to the processor 81. The processor 81 displays, on the display 12, a generated image (e.g., an image generated by executing the above information processing) and/or an externally obtained image.

The main body apparatus 2 includes a codec circuit 87 and speakers (specifically, a left speaker and a right speaker) 88. The codec circuit 87 is connected to the speakers 88 and an audio input/output terminal 25 and also connected to the processor 81. The codec circuit 87 is for controlling the input and output of audio data to and from the speakers 88 and the sound input/output terminal 25.

The main body apparatus 2 includes a power control section 97 and a battery 98. The power control section 97 is connected to the battery 98 and the processor 81. Further, although not illustrated, the power control section 97 is connected to components of the main body apparatus 2 (specifically, components that receive power supplied from the battery 98, the left-side terminal 17, and the right-side terminal 21). Based on a command from the processor 81, the power control section 97 controls the supply of power from the battery 98 to each of the above components.

Further, the battery 98 is connected to the lower-side terminal 27. When an external charging device (e.g., the cradle) is connected to the lower-side terminal 27, and power is supplied to the main body apparatus 2 via the lower-side terminal 27, the battery 98 is charged with the supplied power.

Figure 7:
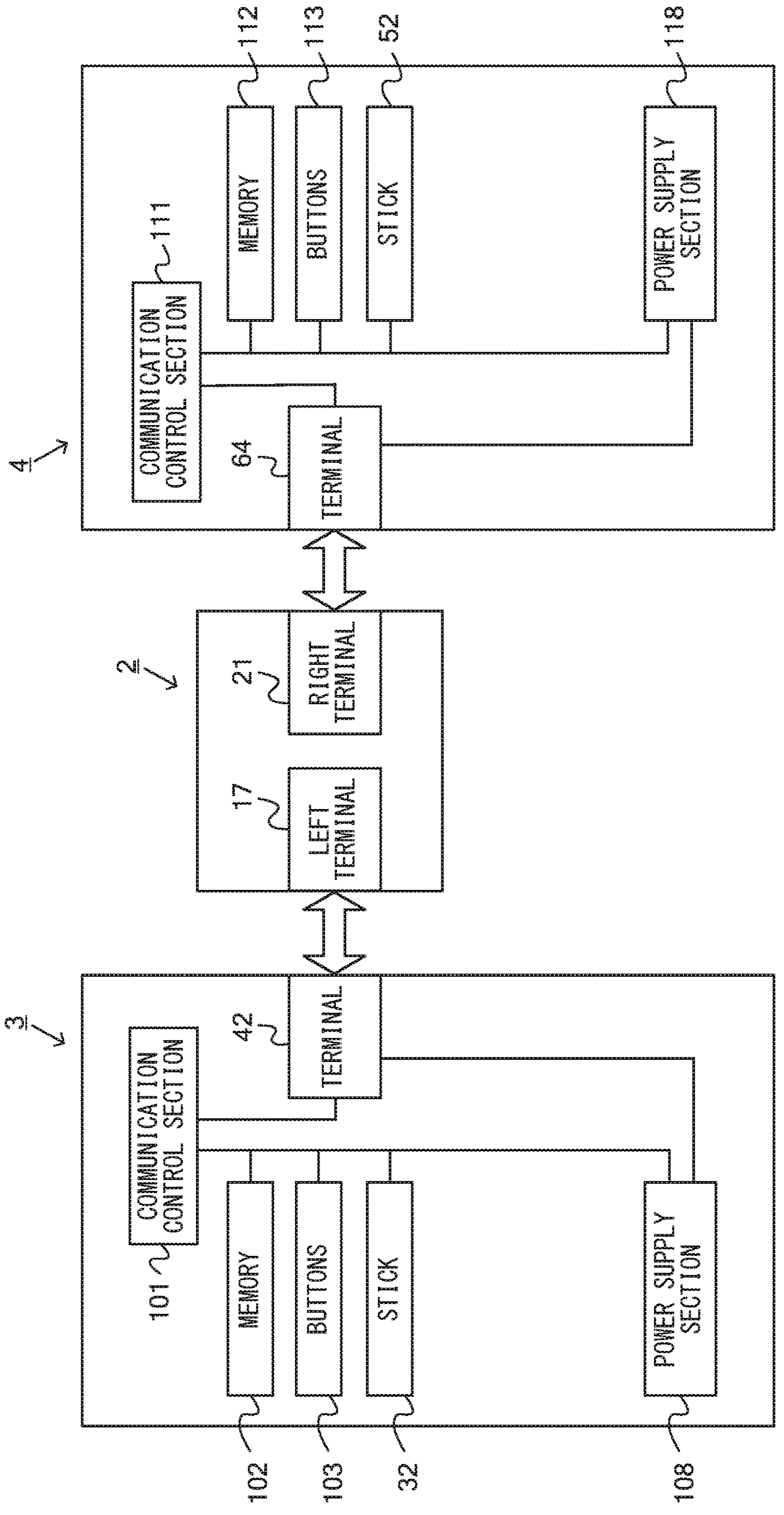
FIG. 7 is a block diagram illustrating non-limiting examples of internal configurations of a main body apparatus 2, a left controller 3, and a right controller 4.

FIG. 7 is a block diagram illustrating examples of the internal configurations of the main body apparatus 2, the left controller 3, and the right controller 4. It should be noted that the details of the internal configuration of the main body apparatus 2 are illustrated in FIG. 6 and therefore are omitted in FIG. 7.

The left controller 3 includes a communication control section 101, which communicates with the main body apparatus 2. As illustrated in FIG. 7, the communication control section 101 is connected to components including the terminal 42. In the present example, the communication control section 101 can communicate with the main body apparatus 2 through both wired communication via the terminal 42 and wireless communication without via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the analog stick ("stick" in FIG. 7) 32. Each of the buttons 103 and the analog stick 32 outputs information regarding an operation performed on itself to the communication control section 101 repeatedly at appropriate timing.

The communication control section 101 obtains information regarding an input (specifically, information regarding an operation or the detection result of the sensor) from each of input sections (specifically, the buttons 103 and the analog stick 32). The communication control section 101 transmits operation data including the obtained information (or information obtained by performing predetermined processing on the obtained information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the analog stick 32 based on the operation data.

The left controller 3 includes a power supply section 108. In the present example, the power supply section 108 includes a battery and a power control circuit. Although not illustrated in FIG. 7, the power control circuit is connected to the battery and also connected to components of the left controller 3 (specifically, components that receive power supplied from the battery).

As illustrated in FIG. 7, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, a communication control section 111 can communicate with the main body apparatus 2 through both wired communication via the terminal 64 and wireless communication without via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113, and the analog stick 52. These input sections have functions similar to those of the input sections of the left controller 3 and operate similarly to the input sections of the left controller 3.

The right controller 4 includes a power supply section 118. The power supply section 118 has a function similar to that of the power supply section 108 of the left controller 3 and operates similarly to the power supply section 108.

As described above, in the game system 1 of the present example, the left controller 3 and the right controller 4 are removable from the main body apparatus 2. In addition, when the unified apparatus obtained by attaching the left controller 3 and the right controller 4 to the main body apparatus 2 or the main body apparatus 2 alone is attached to the cradle, an image (and sound) can be output on an external display device, such as a stationary monitor or the like. The game system 1 will be described below according to an embodiment in which an image is displayed on the display 12. It should be noted that in the case in which the game system 1 is used in an embodiment in which an image is displayed on the display 12, the game system 1 may be used with the left controller 3 and the right controller 4 attached to the main body apparatus 2 (e.g., the main body apparatus 2, the left controller 3, and the right controller 4 are integrated in a single housing).

A game is played using a virtual space displayed on the display 12, according to operations performed on the operation buttons and sticks of the left controller 3 and/or the right controller 4, or touch operations performed on the touch panel 13 of the main body apparatus 2, in the game system 1. In the present example, as an example, a game can be played using a player character PC that performs an action in a virtual space according to the user's operation performed using the operation buttons and the sticks.

Figure 8:
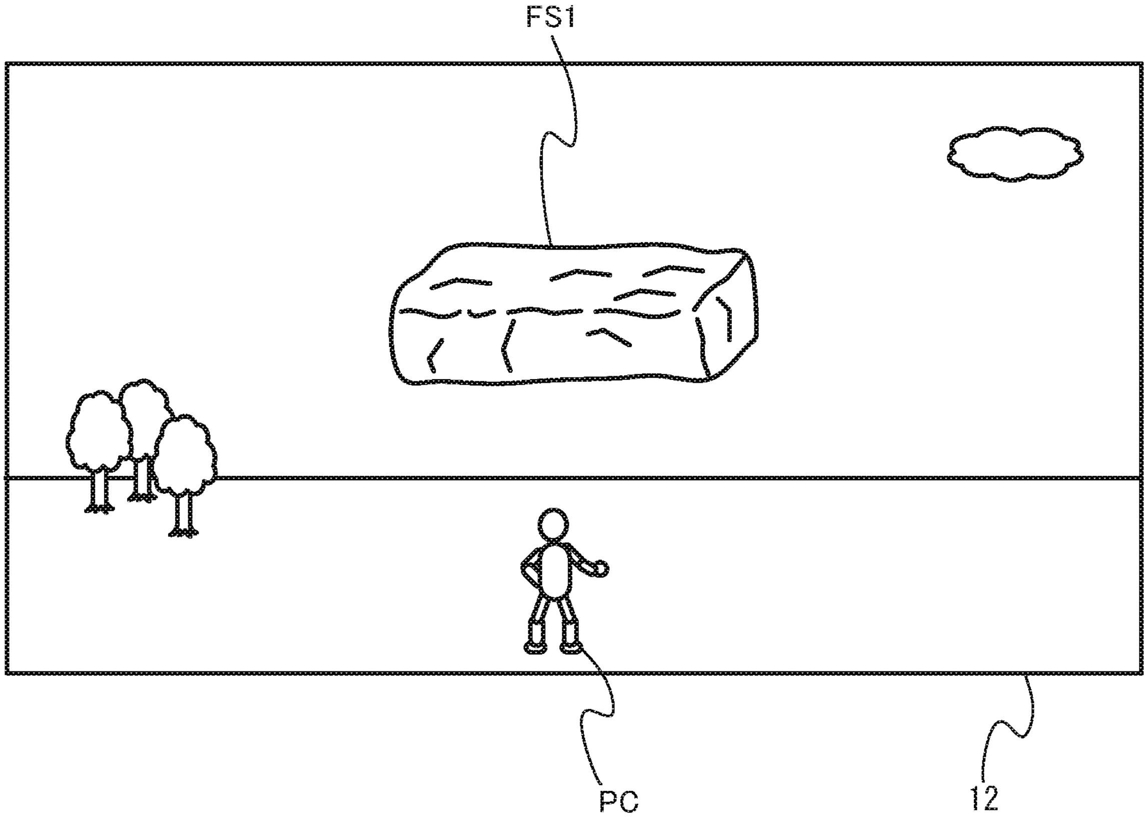
FIG. 8 is a diagram illustrating a non-limiting example of a game image showing that a floating stone object FS1 is disposed in the air of a virtual space.
Figure 19:
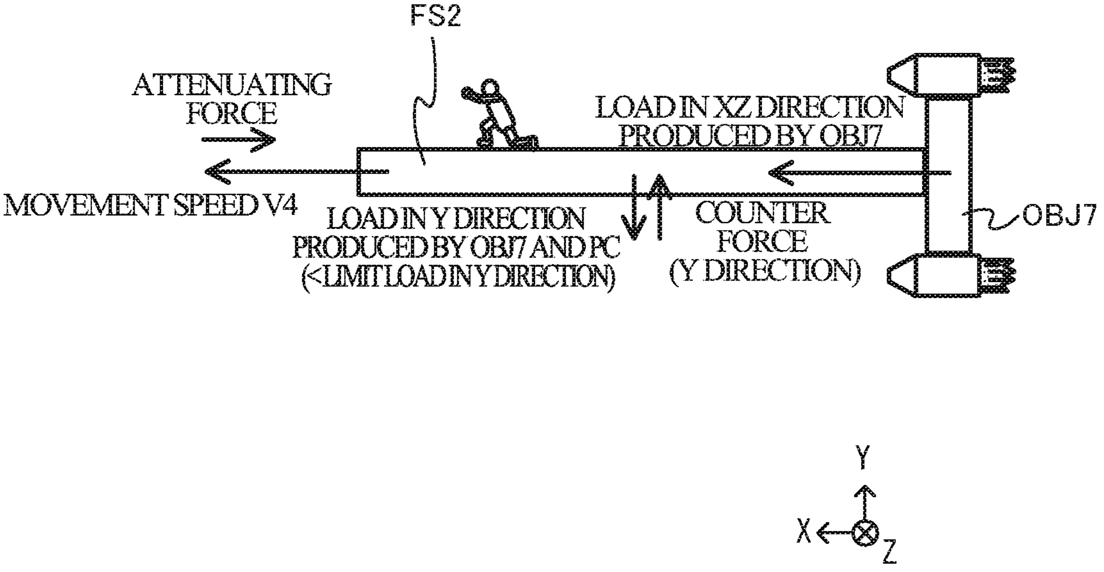
FIG. 19 is a diagram illustrating a non-limiting example of a load applied to a floating stage object FS2 and a movement speed of the floating stage object FS2 in a fourth game process example.

A game process executed in the game system 1 will be outlined with reference to FIGS. 8 and 19. In the present example, a floating object is provided in the air of a virtual space. When a load that does not exceed a limit load is applied to the floating object in a predetermined direction of the floating object, then if a counter force for causing the floating object to remain at a position is applied to the floating object, it is possible to get on the floating object, and the floating object can be moved, by a behavior that can withstand to some extent in the air. In the following description, as examples of the load applied to the floating object, an example of a realized floating object will be described using first to fourth game process examples.

Figure 9:
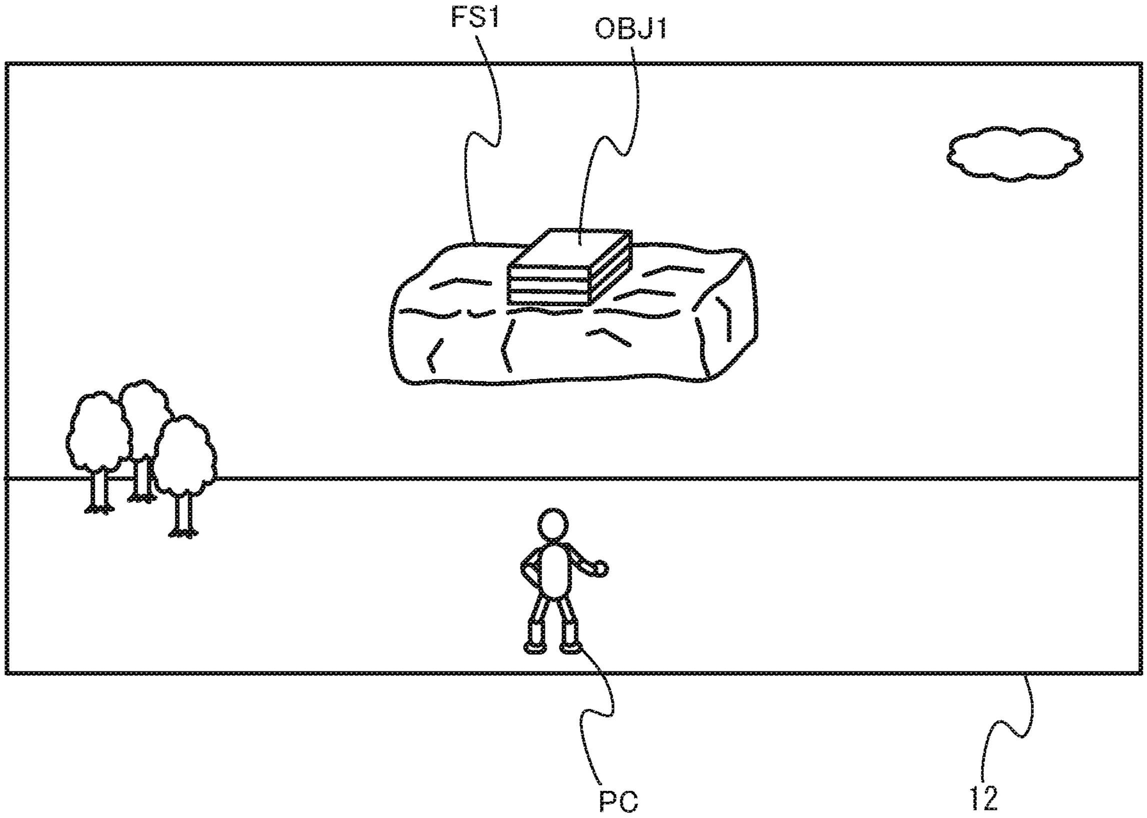
FIG. 9 is a diagram illustrating a non-limiting example of a game image showing that a floating stone object FS1 is disposed in the air with an object OBJ1 placed on the floating stone object FS1.
Figure 10:
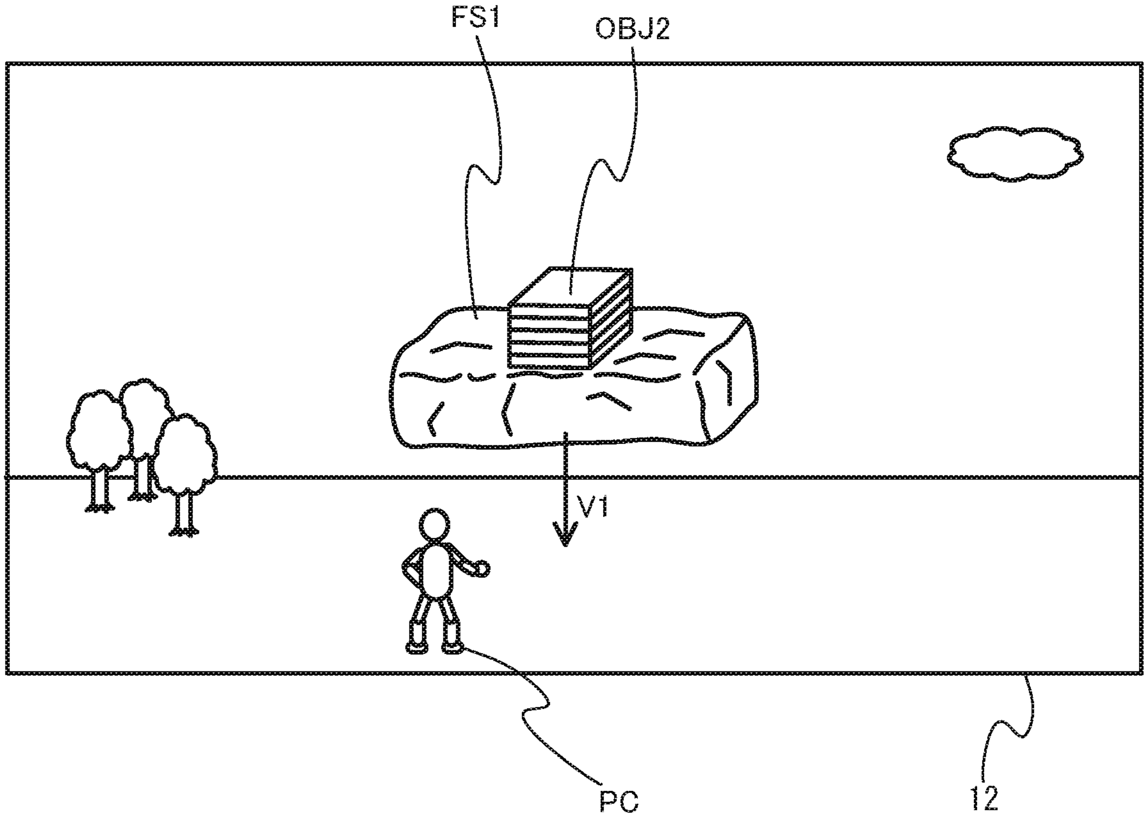
FIG. 10 is a diagram illustrating a non-limiting example of a game image showing that a floating stone object FS1 moves downward in the air due to an object OBJ2 placed on the floating stone object FS1.
Figure 11:
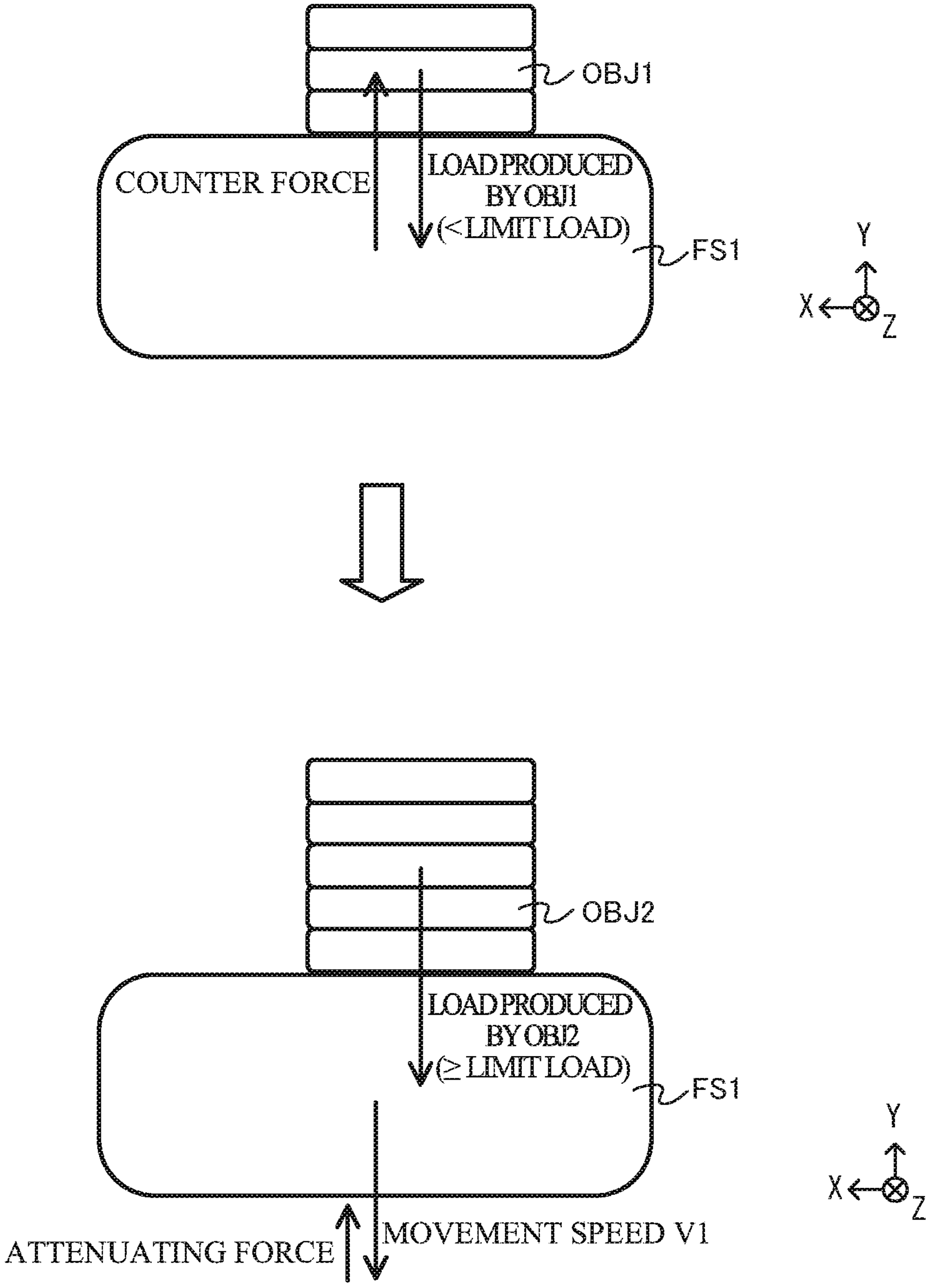
FIG. 11 is a diagram illustrating a non-limiting example of a load applied to a floating stone object FS1 and a movement speed of the floating stone object FS1 in each state in a first game process example.

A first game process example in which a load is applied to a floating object in a gravitational direction will be outlined with reference to FIGS. 8 to 11. It should be noted that FIG. 8 is a diagram illustrating an example of a game image showing that a floating stone object FS1 is disposed in the air of a virtual space. FIG. 9 is a diagram illustrating an example of a game image showing that a floating stone object FS1 is disposed in the air with an object OBJ1 placed on the floating stone object FS1. FIG. 10 is a diagram illustrating an example of a game image showing that a floating stone object FS1 moves downward in the air due to an object OBJ2 placed on the floating stone object FS1. FIG. 11 is a diagram illustrating an example of a load applied to a floating stone object FS1 and a movement speed of the floating stone object FS1 in each state in the first game process example.

In FIG. 8, an image in which a player character PC is disposed on a game field of a virtual space and a floating stone object FS1 is disposed in the air of the virtual space, is displayed on the display 12. The player character PC can move and perform an action on the game field of the virtual space based on the user's operation input. Although, in the present example, it is assumed that game images are displayed on the display 12 of the main body apparatus 2, game images may be displayed on another display device connected to the main body apparatus 2.

The player character PC can move in the virtual space according to the user's movement operation input, and perform the action of touching, hitting, or attacking other characters and virtual objects according to the user's action command operation input (e.g., an operation input of pressing down an operation button 53 (A-button)). As an example, the player character PC's action of getting on the floating stone object FS1 can be controlled according to the user's action command operation input. For the player character PC, its own weight (self-weight) is set. When the player character PC gets on the floating stone object FS1, the load produced by the self-weight is applied to the floating stone object FS1 in the gravitational direction.

The floating stone object FS1 is an example of a floating object disposed in the air of the virtual space. The floating stone object FS1 is a rigid body such as a rock or stone that can stay in the air of the virtual space. On the floating stone object FS1, other objects or characters (e.g., the player character PC) can be placed. For example, as illustrated in FIG. 8, when nothing is placed on the floating stone object FS1, so that no external load is applied to the floating stone object FS1, the floating stone object FS1 stays or is disposed at a position, floating in the air of the virtual space. It should be noted that the floating stone object FS1 may be set as a rigid body without its own weight (self-weight), or a rigid body having a predetermined weight.

For the floating stone object FS1, a limit load is set. Even when a load that does not exceed the limit load is placed on the floating stone object FS1, the floating stone object FS1 stays or is disposed at a position, floating in the air of the virtual space. For example, in FIG. 9, an object OBJ1 that is lighter than the limit load is placed on the floating stone object FS1. When the object OBJ1 is placed on the floating stone object FS1, the floating stone object FS1 is disposed in the air of the virtual space, remaining at the position before the object OBJ1 is placed thereon. This also holds true of the case in which the player character PC gets on the floating stone object FS1. When the total sum of the weights of the player character PC and objects on the floating stone object FS1 does not exceed the limit load, the floating stone object FS1 is disposed in the air of the virtual space, remaining at a position in the air.

On the other hand, when an object that is heavier than the limit load is placed on the floating stone object FS1, the floating stone object FS1 moves downward from the position where the floating stone object FS1 has been floating in the air of the virtual space. For example, an object OBJ2 illustrated in FIG. 10 is heavier than the object OBJ1 and has a weight that exceeds the limit load. When the object OBJ2 is placed on the floating stone object FS1, the floating stone object FS1 moves downward in the gravitational direction of the virtual space at a movement speed V1 based on the weight of the object OBJ2. This also holds true of the case in which the player character PC gets on the floating stone object FS1. When the total sum of the weights of the player character PC and objects on the floating stone object FS1 exceeds the limit load, the floating stone object FS1 moves downward in the gravitational direction of the virtual space at a movement speed based on the total sum of the weights. It should be noted that in the present example, when the floating stone object FS1 moves downward in the air, a force that attenuates the movement speed is applied to the floating stone object FS1, so that the floating stone object FS1's behavior is relatively slowed.

Loads applied to the floating stone object FS1 and the movement speeds of the floating stone object FS1 in the above two states will be described with reference to FIG. 11. In the following description, X, Y, and Z axes that are orthogonal to each other are set in the virtual space, the vertical direction of the virtual space is referred to as a Y direction (the upward direction is referred to as a positive Y direction and the downward direction is referred to as a negative Y direction), the two-dimensional horizontal direction of the virtual space is referred to as an XZ direction (the left-right direction is referred to as an X direction and the depth direction is referred to as a Z direction). In addition, in the following description, it is assumed that the floating stone object FS1's own weight is zero, and when nothing is placed on the floating stone object FS1, i.e., no external load is applied to the floating stone object FS1 (the state illustrated in FIG. 8), no load is applied to the floating stone object FS1, so that the floating stone object FS1 stays or is disposed at a position, floating in the air of the virtual space.

In the present example, the floating stone object FS1 is caused to float in the air, and a load applied to the floating stone object FS1 is resolved into components in the vertical direction (Y direction) and the two-dimensional horizontal direction (XZ direction), and control is executed such that an independent resistant force is applied in each direction, in order to represent the limit load of the floating stone object FS1. For example, the upper portion of FIG. 11 illustrates a state in which the object OBJ1 is placed on the floating stone object FS1. In this state, the load produced by the weight of the object OBJ1 is applied to the floating stone object FS1 in the gravitational direction (negative Y direction), and does not exceed the limit load of the floating stone object FS1. In the present example, when a load that does not exceed the limit load is applied to the floating stone object FS1 in the downward direction (negative Y direction) of the virtual space, a counter force for maintaining the position of the floating stone object FS1 in the virtual space is further applied to the floating stone object FS1. As illustrated in the upper portion of FIG. 11, the counter force is the opposite of the load applied to the floating stone object FS1 in the downward direction (negative Y direction), i.e., has the same magnitude of the load and is directed in the upward direction (positive Y direction) of the virtual space. The counter force further applied to the floating stone object FS1 cancels the load produced by the weight of the object OBJ1 placed on the floating stone object FS1, and therefore, the floating stone object FS1 is disposed in the air of the virtual space, remaining at the position before the object OBJ1 is placed.

The counter force may be calculated based on the floating stone object FS1's motion. For example, the position and orientation of the floating stone object FS1 that are updated based on physical calculation are stored. In addition, the position and orientation of the floating stone object FS1 that are taken when the floating stone object FS1 is moved in the negative Y direction due to the load produced by the weight of the object OBJ1 without the counter force being applied thereto are calculated. A counter force for returning the floating stone object FS1 from the calculated position and orientation to the immediately previous position and orientation stored (specifically, the position and orientation updated in the previous process (process of the previous frame)) in the upward direction (positive Y direction) of the virtual space is calculated as the counter force further applied to the floating stone object FS1. By calculating such a counter force, a counterbalance load that causes the floating stone object FS1 to remain in the air even when the load produced by the weight of the object OBJ1 is applied to the floating stone object FS1 in the negative Y direction of the virtual space can be calculated. In addition, if a counter force is calculated based on the motion of the floating stone object FS1, the counter force can be easily calculated even when various objects or characters are placed on the floating stone object FS1, without a process of calculating a load that is applied due to each state or each object or character individually.

In addition, based on the motion of the floating stone object FS1, it may be determined whether or not the load applied to the floating stone object FS1 in the negative Y direction exceeds the limit load. For example, the position and orientation of the floating stone object FS1 as well as the counter force applied to the floating stone object FS1 are stored. A difference between the position and orientation of the floating stone object FS1 calculated in the previous process and those calculated in the current process, in the Y direction, i.e., a movement amount of the floating stone object FS1 in the Y direction, is calculated, and the counter force in the Y direction that was applied in the previous process is subtracted from the force in the Y direction for producing the movement amount, to calculate a load that is actually applied to the floating stone object FS1 in the current process. By comparing the load thus calculated with the limit load, it can be determined whether or not the load applied to the floating stone object FS1 in the negative Y direction exceeds the limit load. In addition, if the determination of the limit load is executed based on the motion of the floating stone object FS1, the determination of the limit load can be easily executed even when various objects or characters are placed on the floating stone object FS1, without a process of calculating a load that is applied due to each state or each object or character individually.

A lower portion of FIG. 11 illustrates a state in which the object OBJ2 is placed on the floating stone object FS1. In this state, the load produced by the weight of the object OBJ2 is applied to the floating stone object FS1 in the gravitational direction (negative Y direction), so that the limit load of the floating stone object FS1 is exceeded. In the present example, when a load exceeding the limit load is applied to the floating stone object FS1 in the downward direction (negative Y direction) of the virtual space, the counter force in the positive Y direction is set "off" (removed). As a result, as illustrated in the lower portion of FIG. 11, there is no load that cancels the load produced by the object OBJ2 and applied to the floating stone object FS1, so that the floating stone object FS1 moves downward in the air at the movement speed V1 based on the load produced by the weight of the object OBJ2. It should be noted that when the floating stone object FS1 moves downward in the air in the negative Y direction, a force in the positive Y direction that attenuates the movement speed is also applied to the floating stone object FS1. As an example, the movement speed V1 at which the floating stone object FS1 is moved is calculated by multiplying the speed calculated based on the applied load by a value of less than one, or subtracting a predetermined value from the speed.

After the floating stone object FS1 is moved due to the load exceeding the limit load, when the load becomes lower than or equal to the limit load, a counter force corresponding to the load is applied to the floating stone object FS1 in the positive Y direction. As a result, the floating stone object FS1 stops moving downward at a position where the floating stone object FS1 is present at the time when the applied load becomes lower than or equal to the limit load, and stays or floats in the air at the position.

It should be noted that in the present example, even when the floating stone object FS1 is moving downward, the position and orientation at a lower level of the floating stone object FS1 are always updated and stored as a target position and target orientation where the floating stone object FS1 should be stopped in the air. In the present example, if, when the floating stone object FS1 is moving downward, the load applied to the floating stone object FS1 in the negative Y direction becomes lower than or equal to the limit load, a counter force in the positive Y direction for returning to the target position and target orientation (i.e., the position and orientation of the floating stone object FS1 calculated in the previous frame) is applied to the floating stone object FS1. It should be noted that when the floating stone object FS1 is moving downward, the determination of comparing the load applied to the floating stone object FS1 in the negative Y direction with the limit load may be executed by comparing the load that is calculated based on the movement amount during the movement, taking the attenuation of the movement speed into account, with the limit load, since the counter force is not applied to the floating stone object FS1.

Figure 12:
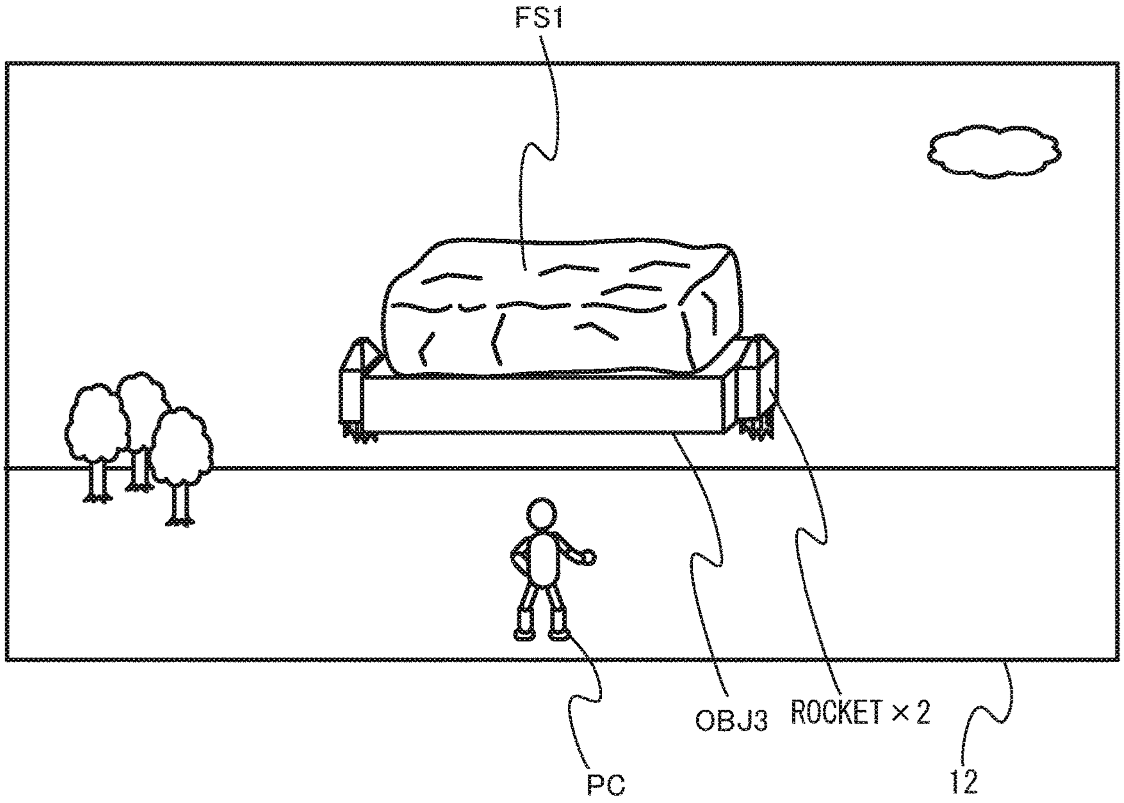
FIG. 12 is a diagram illustrating a non-limiting example of a game image showing that a floating stone object FS1 is disposed in the air with a thrust in an upward direction produced by an object OBJ3 applied thereto.
Figure 13:
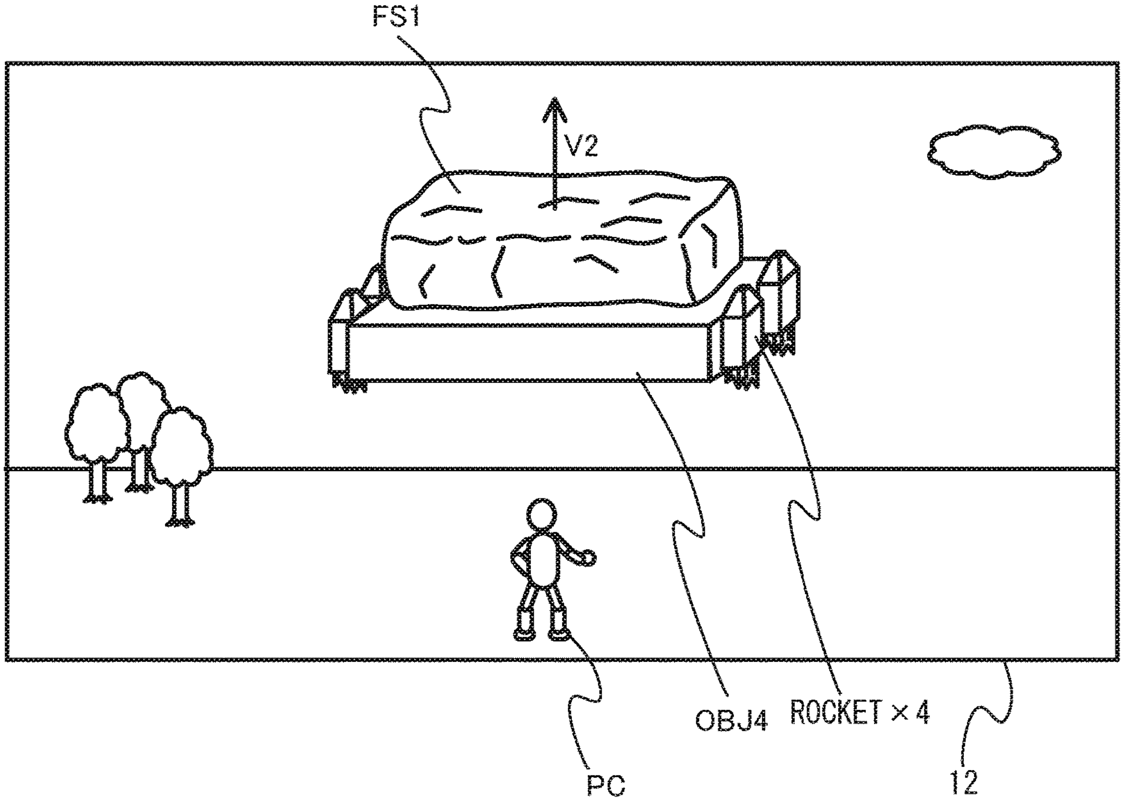
FIG. 13 is a diagram illustrating a non-limiting example of a game image showing that a floating stone object FS1 is moved upward by a thrust in an upward direction produced by an object OBJ3.
Figure 14:
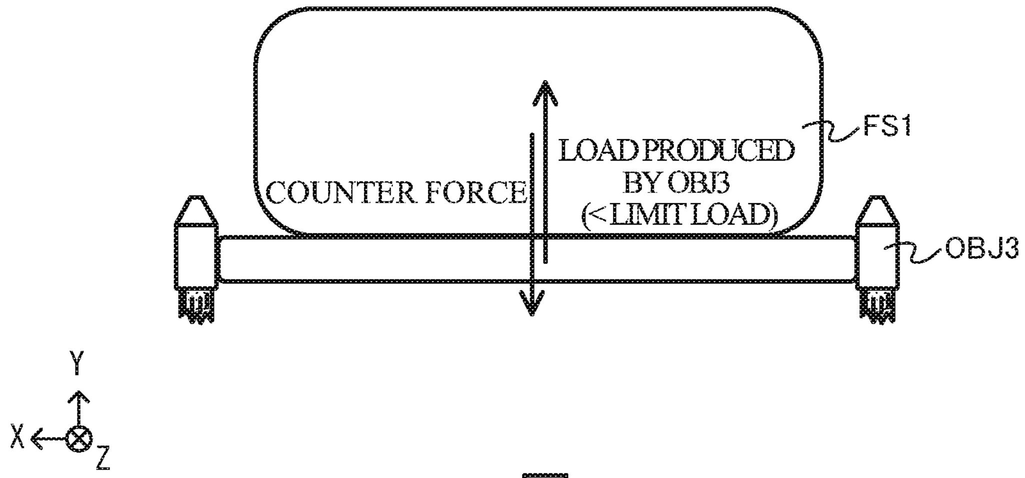
FIG. 14 is a diagram illustrating a non-limiting example of a load applied to a floating stone object FS1 and a movement speed of the floating stone object FS1 in each state in a second game process example.
Figure 14:
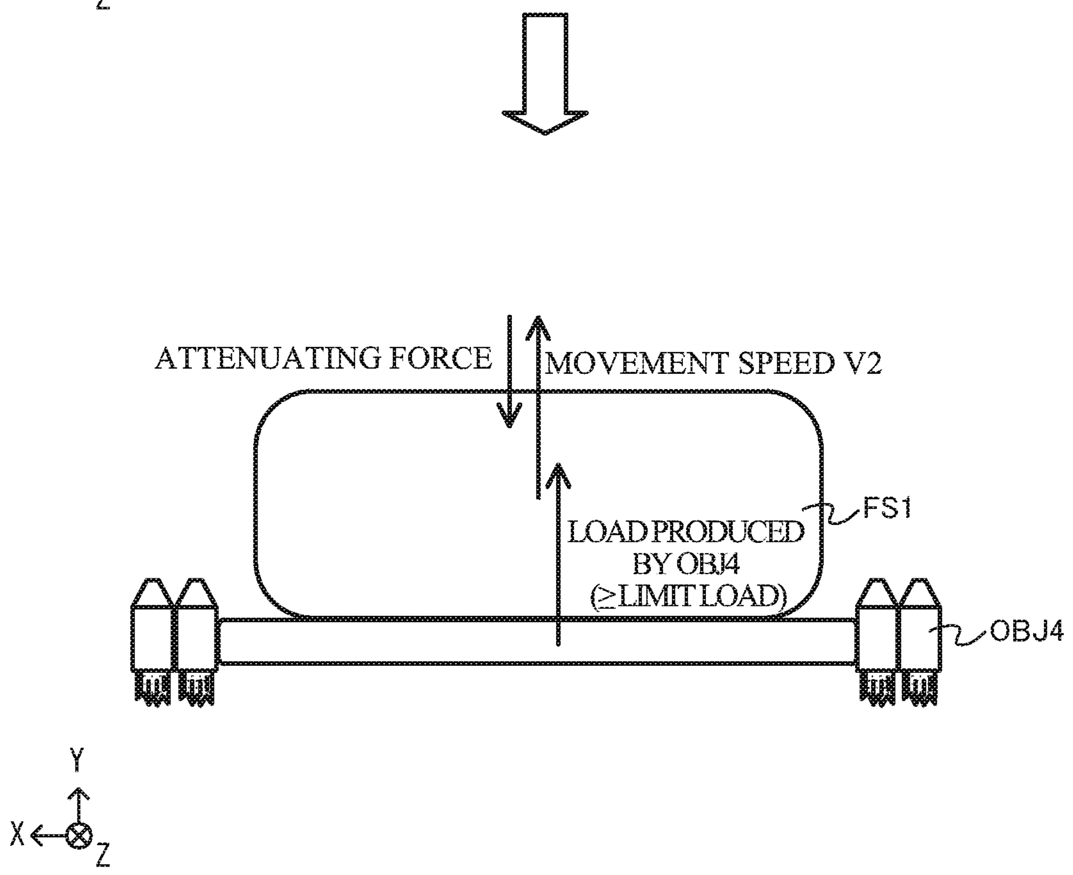

A second game process example in which a load is applied to a floating object in the upward direction will be outlined with reference to FIGS. 12 to 14. It should be noted that FIG. 12 is a diagram illustrating an example of a game image showing that a floating stone object FS1 is disposed in the air with a thrust in the upward direction produced by an object OBJ3 applied thereto. FIG. 13 is a diagram illustrating an example of a game image showing that a floating stone object FS1 is moved upward by a thrust in the upward direction produced by an object OBJ3. FIG. 14 is a diagram illustrating an example of a load applied to a floating stone object FS1 and a movement speed of the floating stone object FS1 in each state in the second game process example.

A limit load is also set for movement of a floating stone object FS1 in the air in the upward direction (positive Y direction) of the virtual space. When the floating stone object FS1 is lifted up by a load that does not exceed the limit load, the floating stone object FS1 does not move upward from that position and stays or is disposed at the position, floating in the air of the virtual space. For example, in FIG. 12, the floating stone object FS1 is lifted up due to contact with an object OBJ3 that is moved upward by thrusts produced by two rockets. The object OBJ3 may be in contact with and push the floating stone object FS1 with the object OBJ3 being detachable from the floating stone object FS1, or may be joined to and integrated with the floating stone object FS1 as described below. The object OBJ3 applies an upward load produced by a thrust that does not exceed the limit load in the upward direction of the floating stone object FS1 in the virtual space to the floating stone object FS1, and therefore, the floating stone object FS1 is disposed in the air of the virtual space, remaining at the position before the floating stone object FS1 is lifted up by the object OBJ3. It should be noted that the limit load related to upward movement in the upward direction and set for the floating stone object FS1 may have the same or different load amount as or from that of the above limit load related to downward movement in the downward direction.

On the other hand, when the floating stone object FS1 is lifted up by a thrust that exceeds the limit load, the floating stone object FS1 moves upward from the position where the floating stone object FS1 is floating in the air of the virtual space. For example, an object OBJ4 illustrated in FIG. 13 has four rockets that provide a thrust greater than that of the object OBJ3, and when being in contact with the floating stone object FS1, can apply an upward thrust that exceeds the limit load. The object OBJ4 may be in contact with and push the floating stone object FS1 with the object OBJ4 being detachable from the floating stone object FS1, or may be joined to and integrated with the floating stone object FS1 as described below. When the floating stone object FS1 is lifted up by the object OBJ4, the floating stone object FS1 moves upward in the virtual space at a movement speed V2 based on the load applied by the object OBJ4. In addition, when the player character PC and other objects are placed on the floating stone object FS1, then if a load obtained by subtracting the load in the negative Y direction produced by the weights of the player character PC and objects placed on the floating stone object FS1 from the load in the positive Y direction produced by the above upward thrust exceeds the limit load, the floating stone object FS1 moves upward in the virtual space at a movement speed based on the load. It should be noted that in the present example, even when the floating stone object FS1 moves upward in the air, a force that attenuates the movement speed is applied to the floating stone object FS1.

Loads applied to the floating stone object FS1 and the movement speeds of the floating stone object FS1 in the above two states will be described with reference to FIG. 14.

For example, an upper portion of FIG. 14 illustrates a state in which the floating stone object FS1 is lifted up by the object OBJ3. In this state, the load produced by the upward thrust of the object OBJ3 is applied to the floating stone object FS1 in the upward direction (positive Y direction), and does not exceed the limit load of the floating stone object FS1. In the present example, when a load that does not exceed the limit load is applied to the floating stone object FS1 in the upward direction (positive Y direction) of the virtual space, a counter force for maintaining the position of the floating stone object FS1 in the virtual space is further applied to the floating stone object FS1. As illustrated in the upper portion of FIG. 14, the counter force is the opposite of the load applied to the floating stone object FS1 in the upward direction (positive Y direction), i.e., has the same magnitude of the load and is directed in the downward direction (negative Y direction) of the virtual space. The counter force further applied to the floating stone object FS1 cancels the load produced by the thrust of the object OBJ3 applied to the floating stone object FS1, and therefore, the floating stone object FS1 is disposed in the air of the virtual space, remaining at the position before the floating stone object FS1 is lifted up by the object OBJ3.

The counter force in the negative Y direction may be calculated based on the motion of the floating stone object FS1. For example, the position and orientation of the floating stone object FS1 that are taken when the floating stone object FS1 moves in the positive Y direction due to the load produced by the thrust of the object OBJ3 without the counter force being applied thereto are calculated, and a force for returning the floating stone object FS1 from the calculated position and orientation to the immediately previous position and orientation stored (specifically, the position and orientation updated in the previous process (process of the previous frame)) in the downward direction (negative Y direction) of the virtual space is calculated as a counter force further applied to the floating stone object FS1. By calculating such a counter force, a counterbalance load that causes the floating stone object FS1 to remain in the air even when the load produced by the thrust of the object OBJ3 is applied to the floating stone object FS1 in the positive Y direction of the virtual space can be calculated. In addition, if a counter force is calculated based on the motion of the floating stone object FS1, the counter force can be easily calculated even when the floating stone object FS1 is lifted up by the object OBJ3 with various objects or characters placed on the floating stone object FS1, without a process of calculating a load that is applied due to each state or each object or character individually.

It should be noted that as with the above load in the negative Y direction, it may be determined, based on the motion of the floating stone object FS1, whether or not the load in the positive Y direction that lifts up the floating stone object FS1 exceeds the limit load.

A lower portion of FIG. 14 illustrates a state in which the floating stone object FS1 is lifted up by the object OBJ4. In this state, the load produced by the thrust of the object OBJ4 is applied to the floating stone object FS1 in the upward direction (positive Y direction), and exceeds the limit load of the floating stone object FS1. In the present example, when a load that exceeds the limit load in the upward direction (positive Y direction) of the virtual space is applied to the floating stone object FS1, the counter force in the negative Y direction is set "off" (removed). As a result, as illustrated in the lower portion of FIG. 14, there is no load that cancels the load produced by the thrust of the object OBJ4 and applied to the floating stone object FS1, so that the floating stone object FS1 moves upward in the air at the movement speed V2 based on the load produced by the thrust of the object OBJ4. It should be noted that when the floating stone object FS1 moves upward in the air in the positive Y direction, a force in the negative Y direction that attenuates the movement speed is also applied to the floating stone object FS1.

After the floating stone object FS1 is moved upward by the load exceeding the limit load, when the load becomes lower than or equal to the limit load, a counter force corresponding to the load is applied to the floating stone object FS1 in the negative Y direction. As a result, the floating stone object FS1 stops moving upward at a position where the floating stone object FS1 is present at the time when the applied load becomes lower than or equal to the limit load, and stays or floats in the air at the position.

It should be noted that in the present example, even when the floating stone object FS1 is moving upward, the position and orientation at a higher level of the floating stone object FS1 are always updated and stored as a target position and target orientation where the floating stone object FS1 should be stopped in the air. In the present example, if, when the floating stone object FS1 is moving upward, the load applied to the floating stone object FS1 in the positive Y direction becomes lower than or equal to the limit load, a counter force in the negative Y direction for returning to the target position and target orientation (i.e., the position and orientation of the floating stone object FS1 calculated in the previous frame) is applied to the floating stone object FS1. It should be noted that when the floating stone object FS1 is moving upward, the determination of comparing the load applied to the floating stone object FS1 in the positive Y direction with the limit load may be executed by comparing the load that is calculated based on the movement amount during the movement, taking the attenuation of the movement speed into account, with the limit load, since the counter force is not applied to the floating stone object FS1.

Figure 15:
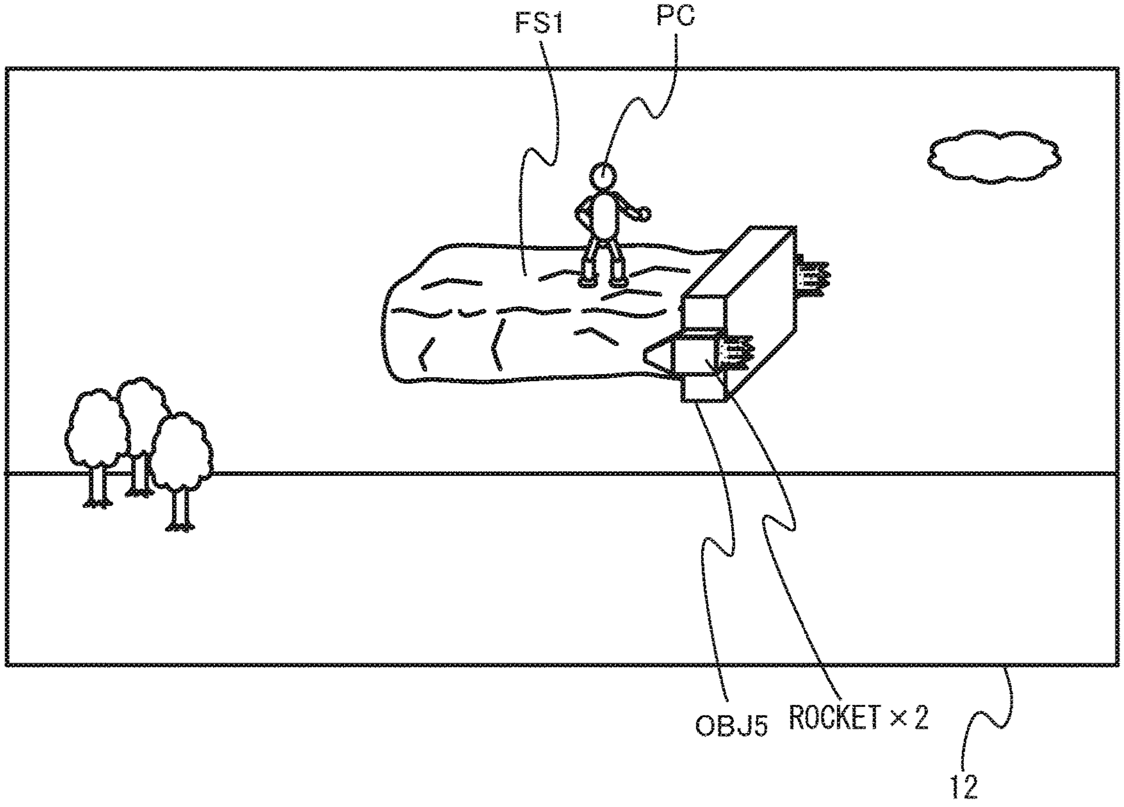
FIG. 15 is a diagram illustrating a non-limiting example of a game image showing a floating stone object FS1 that is disposed in the air with a thrust applied thereto in a horizontal direction by an object OBJ5.
Figure 16:
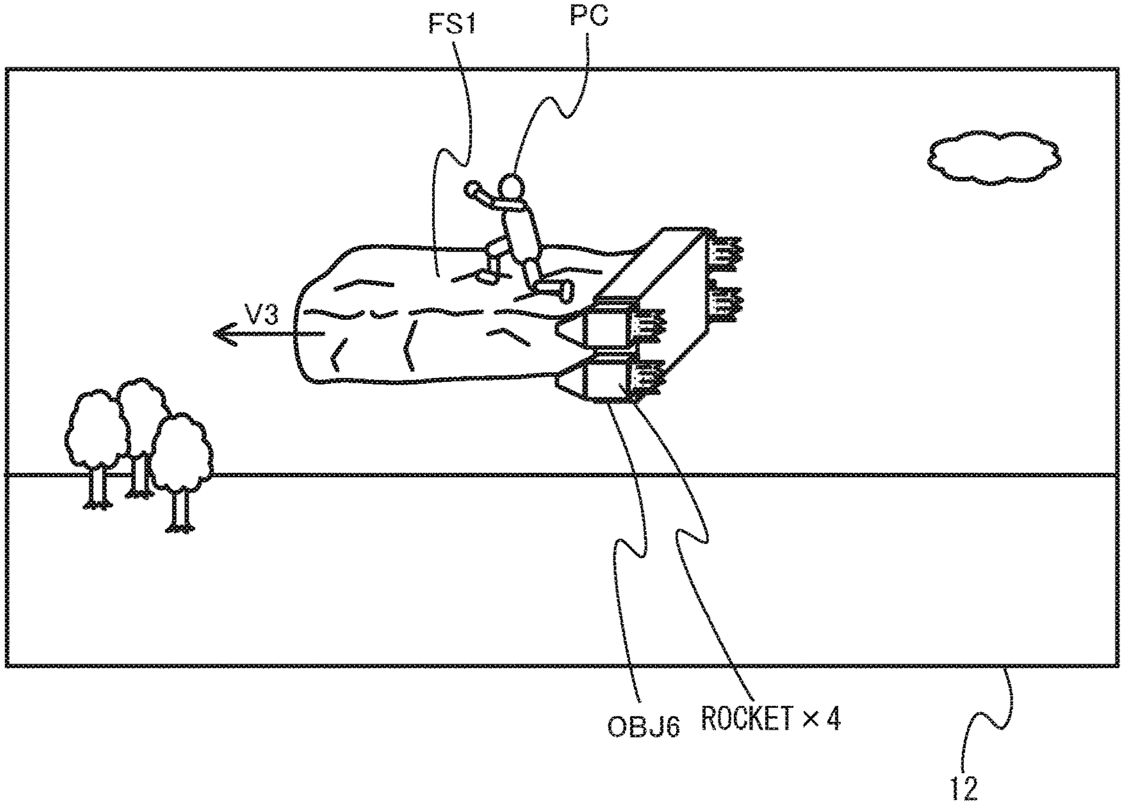
FIG. 16 is a diagram illustrating a non-limiting example of a game image showing a floating stone object FS1 that is moved in the air in a horizontal direction by a thrust of an object OBJ6 in a horizontal direction.
Figure 17:
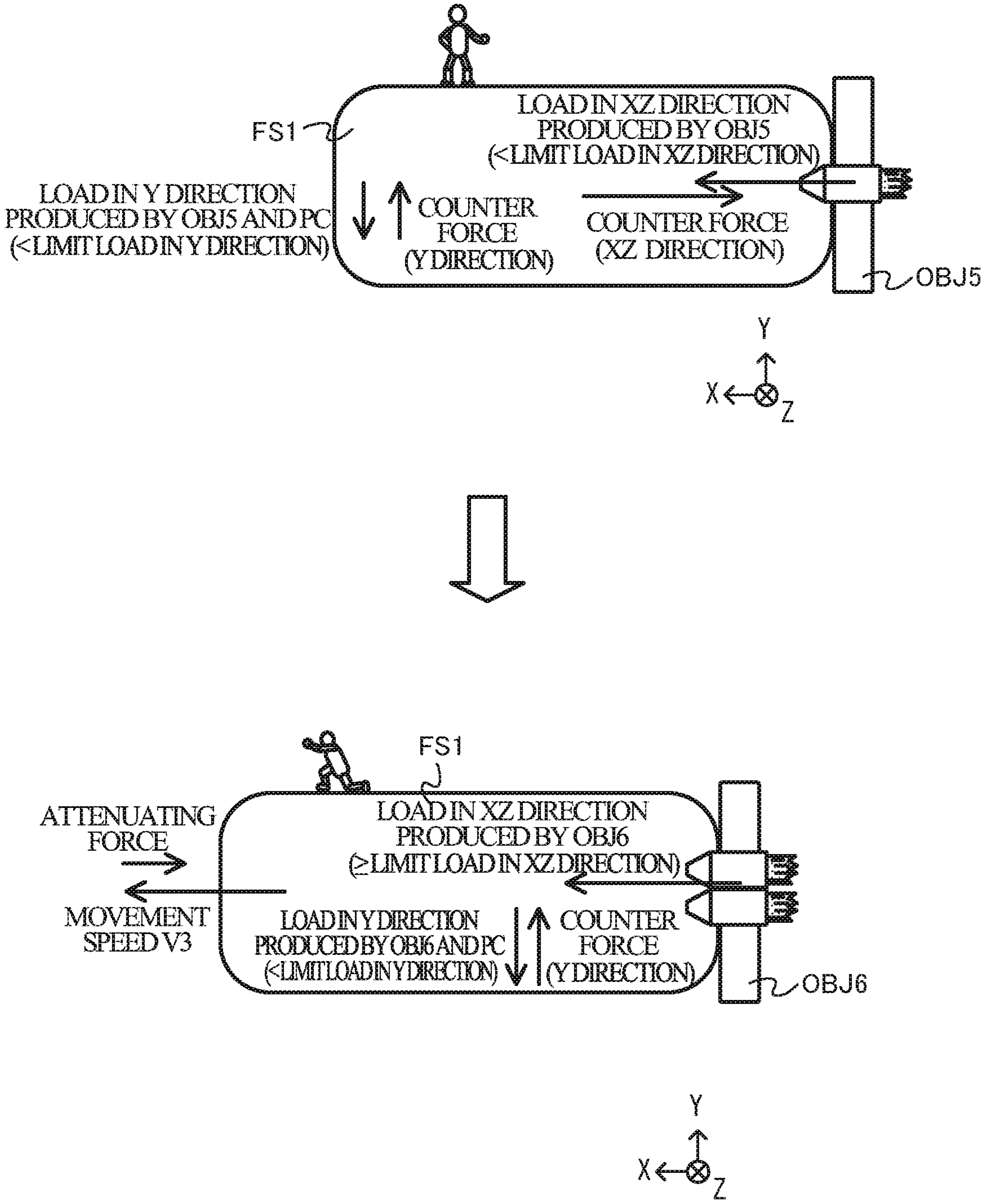
FIG. 17 is a diagram illustrating a non-limiting example of a load applied to a floating stone object FS1 and a movement speed of the floating stone object FS1 in each state in a third game process example.

A third game process example in which a load is applied to a floating object in the vertical direction and in the horizontal direction will be outlined with reference to FIGS. 15 to 17. It should be noted that FIG. 15 is a diagram illustrating an example of a game image showing a floating stone object FS1 that is disposed in the air with a thrust applied thereto in the horizontal direction by an object OBJ5. FIG. 16 is a diagram illustrating an example of a game image showing a floating stone object FS1 that is moved in the air in the horizontal direction by a thrust of an object OBJ6 in the horizontal direction. FIG. 17 is a diagram illustrating an example of a load applied to a floating stone object FS1 and a movement speed of the floating stone object FS1 in each state in the third game process example.

A limit load is set for movement of a floating stone object FS1 in the air in the horizontal direction (XZ direction) of the virtual space. A load in the vertical direction and a load in the horizontal direction are separately controlled. When a load that does not exceed the limit load is applied to the floating stone object FS1 in the horizontal or vertical direction, the floating stone object FS1 does not move from the current position and stays or is disposed at said position, floating in the air of the virtual space. For example, the floating stone object FS1 illustrated in FIG. 15 is pushed in the horizontal direction by being in contact with an object OBJ5 that is moved by a thrust produced by two rockets with the player character PC, which is lighter than the limit load in the vertical direction, placed thereon. The object OBJ5 may be in contact with and push the floating stone object FS1 with the object OBJ5 being detachable from the floating stone object FS1, or alternatively, may be joined and integrated with the floating stone object FS1 as described below. Concerning the vertical direction, even when the load produced by the weight of the object OBJ5 or the like is added to the load in the vertical direction produced by the weight of the player character PC, the limit load in the vertical direction is not exceeded, and therefore, the floating stone object FS1 is disposed in the air of the virtual space, remaining at the position in the vertical direction before the player character PC is placed thereon. In addition, for the horizontal direction, a load that is a thrust smaller than the limit load in the horizontal direction is applied to the floating stone object FS1 in the horizontal direction, the floating stone object FS1 is disposed in the air of the virtual space, remaining at the position in the horizontal direction before the floating stone object FS1 is pushed by the object OBJ5. It should be noted that the limit load set for movement of the floating stone object FS1 in the horizontal direction may have the same or different load amount as or from that of the limit load set for movement in the vertical direction.

On the other hand, when a thrust greater than the limit load is applied to the floating stone object FS1 in the horizontal direction, the floating stone object FS1 is moved in the air of the virtual space in the horizontal direction. For example, an object OBJ6 illustrated in FIG. 16 includes four rockets that provide a thrust greater than that of the object OBJ5, and therefore, can apply a thrust in the horizontal direction that exceeds the limit load to the floating stone object FS1 when the object OBJ6 is in contact with the floating stone object FS1. The object OBJ6 may be in contact with and push the floating stone object FS1 with the object OBJ6 being detachable from the floating stone object FS1, or alternatively, may be joined and integrated with the floating stone object FS1 as described below. When the floating stone object FS1 is pushed by the object OBJ6, the floating stone object FS1 is moved in the virtual space in the horizontal direction at a movement speed V3 based on the load applied by the object OBJ6. On the other hand, for the vertical direction, even when the load in the vertical direction produced by the weight of the object OBJ6 or the like is added to the load produced by the weight of the player character PC, the state in which the limit load in the vertical direction is not exceeded is continued, and therefore, the floating stone object FS1 is disposed in the air of the virtual space, remaining at the position in the vertical direction before the player character PC is placed thereon. By the control in each of the horizontal and vertical directions, the movement of the floating stone object FS1 is controlled such that the floating stone object FS1 is moved in the horizontal direction by the thrust of the object OBJ6 and is not moved in the vertical direction. As a result, the floating stone object FS1 is moved in the horizontal direction of the virtual space at the movement speed V3. It should be noted that the floating stone object FS1 is moved in the horizontal direction at a movement speed based on the load in the XZ direction produced by the thrust of the object OBJ6. When the floating stone object FS1 is moved in the air in the horizontal direction, a force that attenuates the movement speed may also be applied to the floating stone object FS1.

Loads applied to the floating stone object FS1 and the movement speeds of the floating stone object FS1 in the above two states will be described with reference to FIG. 17.

For example, an upper portion of FIG. 17 illustrates a state in which the floating stone object FS1 is pushed by the object OBJ5 with the player character PC placed thereon. In this state, the load produced by the thrust of the object OBJ5 is applied to the floating stone object FS1 in the horizontal direction (XZ direction), and does not exceed the limit load in the horizontal direction of the floating stone object FS1. In addition, although the load produced by the weight of the player character PC (and the object OBJ5) is applied to the floating stone object FS1 in the gravitational direction (negative Y direction), said load in the vertical direction does not exceed the limit load in the vertical direction of the floating stone object FS1.

In the present example, even when a load is applied to the floating stone object FS1 in the horizontal direction (XZ direction) of the virtual space, then if the load does not exceed the limit load in the horizontal direction, a counter force for maintaining the position in the horizontal direction of the floating stone object FS1 is additionally applied to the floating stone object FS1 in the horizontal direction. As illustrated in the upper portion of FIG. 17, the counter force in the horizontal direction is the opposite of the load applied to the floating stone object FS1 in the horizontal direction (XZ direction), i.e., a force that has the same magnitude as that of said load and a direction opposite to that of said load along the horizontal direction. When the counter force in the horizontal direction is additionally applied to the floating stone object FS1, the load in the horizontal direction produced by the thrust of the object OBJ5 applied to the floating stone object FS1 is cancelled, so that the floating stone object FS1 is disposed in the air of the virtual space, remaining at the position in the horizontal direction before the floating stone object FS1 is pushed by the object OBJ5.

The counter force in the horizontal direction may also be calculated based on the motion in the horizontal direction of the floating stone object FS1. For example, the position and orientation of the floating stone object FS1 that are taken when the floating stone object FS1 is moved in the XZ direction by the load produced by the thrust of the object OBJ5 without the counter force in the horizontal direction being applied thereto are calculated, a force for returning the floating stone object FS1 in the horizontal direction (XZ direction) of the virtual space from the calculated position and orientation to the immediately previous position and orientation stored (specifically, the position and orientation updated in the previous process (process for the previous frame)) is calculated as the counter force additionally applied to the floating stone object FS1. By thus calculating the counter force in the horizontal direction, a counterbalance load that causes the floating stone object FS1 to remain in the air even when the load produced by the thrust of the object OBJ5 is applied to the floating stone object FS1 in the XZ direction of the virtual space can be calculated.

It should be noted that as with the above load in the vertical direction, it may be determined whether or not the load applied to the floating stone object FS1 in the XZ direction exceeds the limit load, based on the motion in the horizontal direction of the floating stone object FS1.

In addition, as described above, for the vertical direction (Y direction) in the virtual space, when a load that does not exceed the limit load in the vertical direction is applied to the floating stone object FS1, a counter force for maintaining the position in the vertical direction of the floating stone object FS1 in the virtual space is additionally applied to the floating stone object FS1 in the vertical direction. As illustrated in the upper portion of FIG. 17, the counter force in the vertical direction is the opposite of the load applied to the floating stone object FS1 in the downward direction (negative Y direction), i.e., a force that has the same magnitude as that of said load and is directed in the upward direction (positive Y direction) of the virtual space. When the counter force in the vertical direction is additionally applied to the floating stone object FS1, the load in the vertical direction produced by the weight of the player character PC (and the object OBJ5) placed on the floating stone object FS1 is cancelled, so that the floating stone object FS1 is disposed in the air of the virtual space, remaining at the position in the vertical direction before the player character PC (and the object OBJ5) is placed on the floating stone object FS1.

Thus, when the floating stone object FS1 is pushed by the object OBJ5 in the horizontal direction with the player character PC placed thereon, the floating stone object FS1 is controlled such that the position thereof is maintained both in the horizontal direction and in the vertical directions. As a result, the floating stone object FS1 stays or is displayed at said position, floating in the air of the virtual space.

A lower portion of FIG. 17 illustrates a state in which the floating stone object FS1 is pushed by the object OBJ6 with the player character PC placed thereon. In this state, the load produced by the thrust of the object OBJ6 is applied to the floating stone object FS1 in the horizontal direction (XZ direction), and exceeds the limit load in the horizontal direction of the floating stone object FS1. In the present example, when a load exceeding the limit load in the horizontal direction (XZ direction) of the virtual space is applied to the floating stone object FS1 in the horizontal direction, a counter force in the horizontal direction is set "off" (removed). As a result, as illustrated in the lower portion of FIG. 17, a force in the horizontal direction that cancels the load produced by the thrust of the object OBJ6 and applied to the floating stone object FS1 is removed, and therefore, the floating stone object FS1 is moved in the horizontal direction at the movement speed V3 based on the load produced by the thrust of the object OBJ6. It should be noted that when the floating stone object FS1 is moved in the air in the horizontal direction, a force in the horizontal direction that attenuates the movement speed may also be applied to the floating stone object FS1.

On the other hand, for the vertical direction (Y direction), a load that does not exceed the limit load in the vertical direction is applied to the floating stone object FS1, and therefore, a state in which the counter force for maintaining the position in the vertical direction of the floating stone object FS1 is applied to the floating stone object FS1 in the vertical direction is continued. Therefore, the counter force in the vertical direction that cancels the load in the vertical direction produced by the weight of the player character PC (and the object OBJ5) placed on the floating stone object FS1 is additionally applied, and therefore, the floating stone object FS1 is disposed in the air of the virtual space, remaining at the position in the vertical direction before the player character PC (and the object OBJ5) is placed thereon.

Thus, the state in which the floating stone object FS1 is pushed in the horizontal direction by the object OBJ6 with the player character PC placed thereon is controlled such that the position in the vertical direction of the floating stone object FS1 is maintained. However, the floating stone object FS1 is controlled such that the position in the horizontal direction of the floating stone object FS1 is moved at the movement speed V3. As a result, the floating stone object FS1 is moved in the air of the virtual space in the horizontal direction at the movement speed V3. In the third game process example, a limit load is set in the vertical direction and in the horizontal direction separately, and the floating stone object FS1 is caused to behave such that the position is maintained in each of the vertical and horizontal directions. Therefore, the situation when a load in one direction exceeds a limit load, movement is allowed in the other direction can be inhibited, and movement can be controlled in each of the vertical and horizontal directions.

Figure 18:
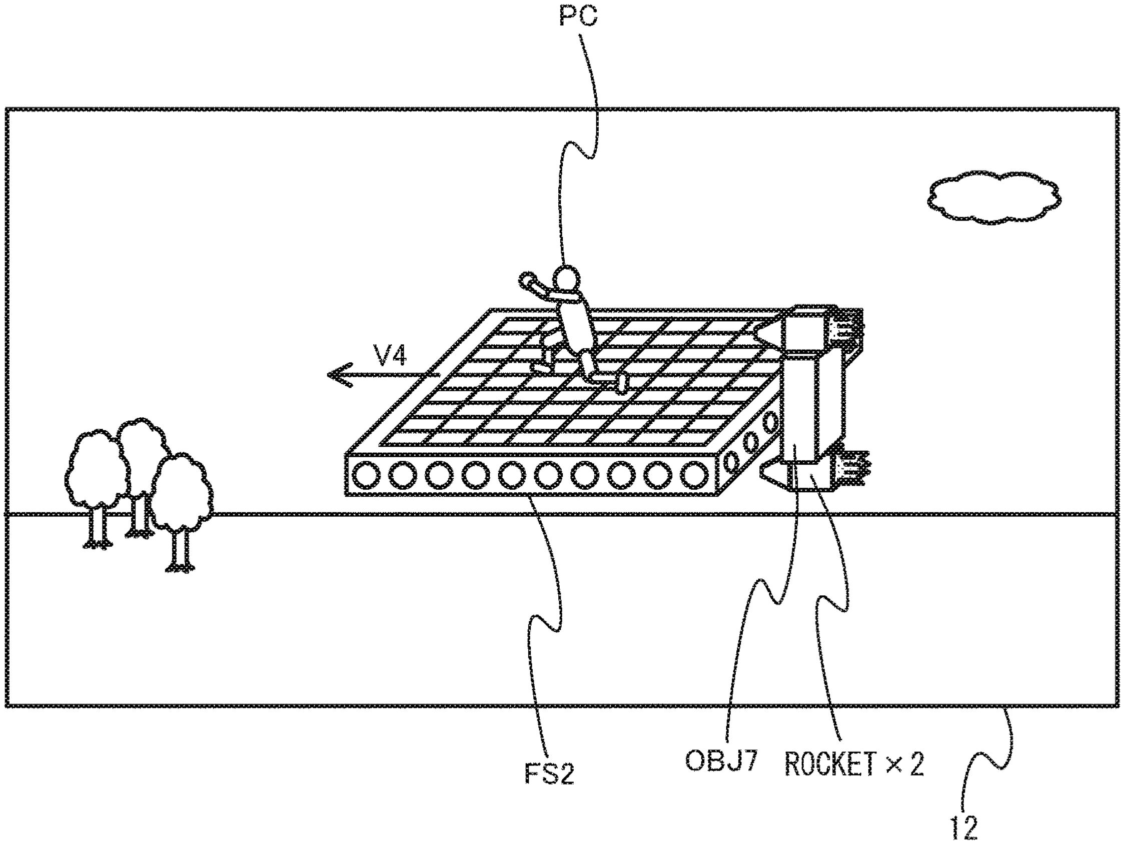
FIG. 18 is a diagram illustrating a non-limiting example of a game image showing that a floating stage object FS2 is disposed in the air with a thrust in a horizontal direction produced by an object OBJ7 applied thereto.

A fourth game process example in which a load is applied to another floating object in the horizontal and vertical directions will be outlined with reference to FIGS. 18 and

19. It should be noted that FIG. 18 is a diagram illustrating an example of a game image showing that a floating stage object FS2 is disposed in the air with a thrust in the horizontal direction produced by an object OBJ7 applied thereto. FIG. 19 is a diagram illustrating an example of a load applied to a floating stage object FS2 and a movement speed of the floating stage object FS2 in the fourth game process example.

A floating stage object FS2 is another example of a floating object disposed in the air of the virtual space. The floating stage object FS2 is a stage-shaped rigid body that can stay in the air of the virtual space. Other objects and characters (e.g., a player character PC) can be placed on the floating stage object FS2. When no external load is applied to the floating stage object FS2, the floating stage object FS2 stays or is disposed at a position, floating in the air of the virtual space, as with the floating stone object FS1. Control can be executed such that a player character PC performs the action of getting on the floating stage object FS2, according to the user's action command operation input. In this case, the floating stage object FS2 serves as a floating scaffold that allows the player character PC to stay at a high level. It should be noted that the floating stage object FS2 may be a rigid body whose weight is zero (no self-weight), or a rigid body having a predetermined weight.

The floating stone object FS1 can move in the vertical and horizontal directions of the virtual space while floating in the air. A limit load is set for each of the upward direction, downward direction, and horizontal direction of the virtual space. As described above, the floating stone object FS1 is controlled such that when a load that does not exceed the limit load is applied to the floating stone object FS1, the floating stone object FS1 does not move from the current position. On the other hand, the floating stage object FS2 can also move in the vertical and horizontal directions of the virtual space while floating in the air, but a limit load is set only for the downward direction of the virtual space. Specifically, the floating stage object FS2 is controlled such that when a load that does not exceed the limit load is applied to the floating stage object FS2 in the downward direction of the virtual space, the floating stage object FS2 does not move from the current position in the downward direction of the virtual space, and when a load that exceed the limit load is applied to the floating stage object FS2 in the downward direction of the virtual space, the floating stage object FS2 moves downward from the current position. For the floating stage object FS2, no limit load is set for the other directions (upward and horizontal directions), and therefore, when a load is applied to the floating stage object FS2 in the other directions, the floating stage object FS2 moves at a movement speed based on the load without being limited by the limit load. It should be noted that the limit load that is set for the floating stage object FS2 and is related to the movement of the floating stage object FS2 in the downward direction may have the same or different load amount as or from that which is related to the movement of the floating stone object FS1 in the vertical and horizontal directions.

For the floating stage object FS2, a load applied thereto in the vertical direction and a load applied thereto in the horizontal direction are controlled separately. For example, a floating stage object FS2 illustrated in FIG. 18 is pushed in the horizontal direction by an object OBJ7 which is moved by the thrust produced by two rockets, being in contact therewith, with the player character PC, which is lighter than the limit load in the downward direction, placed thereon. The object OBJ7 may be in contact with and push the floating stage object FS2 with the object OBJ7 being detachable from the floating stage object FS1, or may be joined to and integrated with the floating stage object FS2 as described below. For the downward direction, even when the load in the vertical direction produced by the weight of the object OBJ7 or the like is added to the load produced by the weight of the player character PC, the resultant load does not exceed the limit load in the downward direction, and therefore, the floating stage object FS2 is disposed in the air of the virtual space, remaining at the position in the vertical direction before the player character PC is placed thereon.

On the other hand, when the floating stage object FS2 is pushed in the horizontal direction of the virtual space, the floating stage object FS2 is moved in the horizontal direction at a movement speed based on the pushing load in the horizontal direction without being limited by the limit load. In addition, when the floating stage object FS2 is lifted up in the upward direction of the virtual space, the floating stage object FS2 is moved upward in a movement speed based on the load lifted up in the upward direction without being limited by the limit load. For example, as illustrated in FIG. 18, when the floating stage object FS2 is pushed by the object OBJ7 in the horizontal direction, the floating stage object FS2 is moved in the virtual space in the horizontal direction at a movement speed V4 based on the load applied to the object OBJ7.

By the above control in each of the horizontal and vertical directions, the movement of the floating stage object FS2 is controlled such that the floating stage object FS2 is moved in the horizontal direction based on the thrust of the object OBJ7 and is not moved in the vertical direction. As a result, the floating stage object FS2 is moved at the movement speed V4 in the horizontal direction of the virtual space. Although the floating stage object FS2 is moved in the horizontal direction at a movement speed based on the load in the XZ direction produced by the thrust of the object OBJ7, a force that attenuates the movement speed of the floating stage object FS2 may be applied to the floating stage object FS2 even when the floating stage object FS2 is moved in the air in the horizontal direction. In addition, even when the floating stage object FS2 is moved in the air in other directions, a force that attenuates the movement speed of the floating stage object FS2 may be applied to the floating stage object FS2.

Loads applied to the floating stage object FS2 and the movement speed of the floating stage object FS2 in the above state will be described with reference to FIG. 19.

In the state illustrated in FIG. 19, the load produced by the thrust of the object OBJ7 is applied to the floating stage object FS2 in the horizontal direction (XZ direction). In the present example, when a load is applied to the floating stage object FS2 in the horizontal direction (XZ direction) of the virtual space, the floating stage object FS2 is moved in the air in the horizontal direction at the movement speed V4 based on the load produced by the thrust of the object OBJ7 without being limited by the limit load. In addition, a force in the horizontal direction that attenuates the movement speed at which the floating stage object FS2 is moved in the air in the horizontal direction is applied to the floating stage object FS2.

On the other hand, for the downward direction (negative Y direction), a load that does not exceed the limit load in the downward direction is applied to the floating stage object FS2, and therefore, a counter force for maintaining the position in the vertical direction of the floating stage object FS2 is applied to the floating stage object FS2 in the upward direction (positive Y direction). Therefore, the counter force in the upward direction that cancels the load in the downward direction produced by the weight of the player character PC (and the object OBJ7), which is placed on the floating stage object FS2, is additionally applied, and therefore, the floating stage object FS2 is disposed in the air of the virtual space, remaining at the position in the vertical direction before the player character PC (and the object OBJ7) is placed thereon.

It should be noted that the counter force applied to the floating stage object FS2 in the upward direction may be calculated based on the motion in the downward direction of the floating stage object FS2. For example, the position and orientation of the floating stage object FS2 that are taken when the floating stage object FS2 is moved in the negative Y direction by the load produced by the weight of the player character PC and the like without a counter force being applied thereto in the upward direction may be calculated, and a force for returning the floating stage object FS2 from the calculated position and orientation to the previous position and orientation stored (specifically, the position and orientation updated in the previous process (process on the previous frame)) in the upward direction (positive Y direction) of the virtual space may be calculated as the counter force that is additionally added to the floating stage object FS2.

Thus, the state in which the floating stage object FS2 is pushed by the object OBJ7 in the horizontal direction with the player character PC placed thereon is controlled such that the position thereof in the vertical direction is maintained, and the position thereof in the horizontal direction is moved at the movement speed V4. As a result, the floating stage object FS2 is moved in the air of the virtual space at the movement speed V4 in the horizontal direction.

It should be noted that in the present example, a plurality of objects may be joined and integrated together to form an assembly object. For example, another object may be attached to the above floating object to form an integrated assembly object. An example in which an assembly object is generated by a player character PC performing an object operation action will be described with reference to FIG. 20. It should be noted that FIG. 20 is a diagram illustrating an example of a game image showing that an object to be controlled (object OBJ8) is moved by a player character PC performing an object operation action so as to be attached to a floating stone object FS1 so that an assembly object AS is generated.

A player character PC can perform an object operation action as one of actions that the player character PC performs according to the user's operation input. The object operation action is, for example, the action of remotely operating an operable object that is located in front of the player character PC as an object to be controlled. For example, one of a plurality of operable objects disposed in the virtual space is set as an object to be controlled by the object operation action, based on the user's operation input, and the movement and orientation of the object to be controlled in the virtual space are controlled. In addition, based on the object operation action, an object to be controlled is combined with and attached to another object disposed in the virtual space, so that an assembly object is generated.

Figure 20:
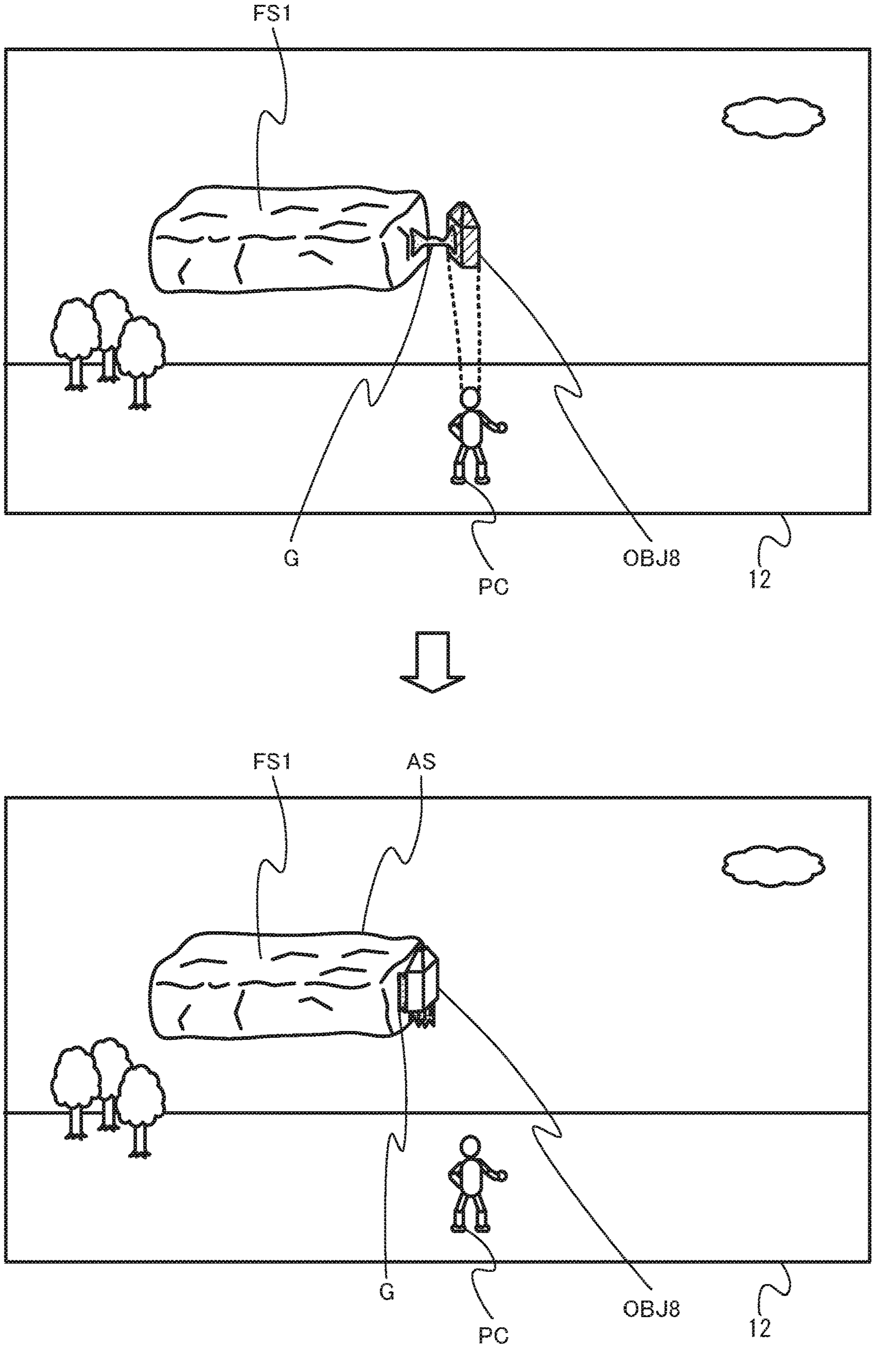
FIG. 20 is a diagram illustrating a non-limiting example of a game image showing that a player character PC generates an assembly object AS by an object operation action.

As illustrated in FIG. 20, when an operable object that may be an object to be controlled according to the object operation action is disposed in front of the player character PC (or in the vicinity of a gaze point of a virtual camera), then if a predetermined user's operation input is performed, the player character PC can perform the object operation action on the operable object. In the example of FIG. 20, an operable object OBJ8 is chosen as an object to be controlled, and an object operation action is performed according to a predetermined user's choice operation input. For example, the operable object OBJ8 is a power source (e.g., a rocket) that, when attached to another object, applies a thrust to said object. When an object operation action is being performed on the operable object OBJ8, the operable object OBJ8 is floating above the ground of the virtual space, and a display form different from the normal display form is provided. Specifically, an operable object that is currently an object to be controlled may be displayed in a color different from those of the other objects, may be displayed with an effect image added thereto, or may be displayed with an effect image different from those of the other objects added thereto (it should be noted that in FIG. 20, a difference in display form is represented by hatching). In addition, in the present example, an effect image indicating that the object operation action is being performed is also displayed (it should be noted that in FIG. 20, the effect image is represented in a dashed line). Thus, when a game image showing a game field is displayed, one of objects on the game field that is an operable object as an object to be controlled by the object operation action, and the performance of the object operation action, can be presented to the user in a manner that allows those to be easily recognized by the user.

When, during the object operation action, the player character PC is moved according to the user's predetermined operation input (e.g., a direction operation input of tilting the analog stick 32 of the left controller 3), the operable object OBJ8, which is currently an object to be controlled by the object operation action, is also moved. In addition, when, during the object operation action, the user's predetermined operation input (e.g., a direction operation input of tilting the analog stick 52 of the right controller 4) is performed, the orientation of the player character PC may be changed, and the operable object OBJ8 may be moved in the virtual space such that the object to be controlled is located in front of the player character PC. Furthermore, when, during the object operation action, the user's predetermined operation input (e.g., a direction operation input of pressing down direction keys 33 to 36) is performed, only the operable object OBJ8, which is an object to be controlled, may be moved in the virtual space. Furthermore, when, during the object operation action, the user's predetermined operation input (e.g., an operation input of pressing down the direction keys 33 to 36 while pressing down an operation button 60 (R-button)), only the operable object OBJ8, which is an object to be controlled, may be rotated in the virtual space.

When the operable object OBJ8 is moved toward the floating stone object FS1 by the object operation action, then if the operable object OBJ8 and the floating stone object FS1 satisfy a predetermined connection condition (e.g., a distance between the two objects is less than a threshold), an attachment object G that connects the operable object OBJ8 to the floating stone object FS1 appears. Specifically, a position in a surface of the operable object OBJ8 that is closest to the floating stone object FS1 is set as one of attachment positions. Likewise, a position in a surface of the floating stone object FS1 that is closest to the operable object OBJ8 is set as the other of the attachment positions. The attachment object G is displayed as connecting these two attachment positions together.

When the user performs an attach command operation input (e.g., an operation input of pressing down the operation button 53 (A-button)), the operable object OBJ8 and the floating stone object FS1 are attached together to generate an assembly object AS. As an example, the operable object OBJ8 and the floating stone object FS1 are attached together such that one of the attachment positions on the operable object OBJ8 is in contact with the other of the attachment positions on the floating stone object FS1. Even after the operable object OBJ8 and the floating stone object FS1 are attached together, the attachment object G, which has been deformed into a gap shape due to the attachment, may remain at the attachment positions of these objects and may be displayed.

Thus, in the present example, the user is allowed to arbitrarily choose an operable object to be attached, attach the chosen operable object to a floating stone object at a position arbitrarily chosen by the user and in any orientation, to generate an assembly object. As used herein, the "attachment" of objects means that the objects are joined together with the objects located close to each other, and behave as an integrated object. For example, when two objects are attached together, the two objects may be in contact with each other. In addition, when two objects are attached together, the two objects may not exactly be in contact with each other. For example, there may be a space between the two objects, or the attachment object G may be interposed between the two objects. In addition, the term "a plurality of objects behave as an integrated object" includes the meaning that a plurality of objects move in the virtual space or change an orientation thereof, behaving as a single object, with a relative positional relationship thereof maintained. In other words, an assembly object obtaining by joining a plurality of objects together is disposed as an integrated object in the virtual space. It should be noted that the relative positional relationship between a plurality of objects attached together may not entirely be fixed, and for example, may be slightly changed with these objects remained attached together when a force or impact is applied to any of the plurality of objects.

For an assembly object that is obtained by joining another object to such a floating object, the above physical determination and physical calculation may also be applied. For example, by calculating a force applied to each object included in an assembly object based on an interaction between the objects, physical calculation may be executed, assuming that the objects included in the assembly object are moved all together, or the assembly object is a single integrated object.

In the case in which the above assembly object is generated, a functional object that functions as a power source which moves the assembly object AS or an operation device which controls the movement of the assembly object AS, such as the object OBJ8 included in the assembly object AS illustrated in FIG. 20, may be included. For example, an assembly object may be generated by joining any of the objects OBJ3 to OBJ7 to a floating object (the floating stone object FS1 or the floating stage object FS2). When a functional object is joined and integrated with a floating object, the resultant assembly object may be moved or operated in the virtual space according to an operation action performed by the player character PC placed thereon.

In addition, the first to fourth game process examples have been described using a floating object (floating stone object FS1) for which a limit load is set in each of the vertical and horizontal directions of the virtual space and which can be moved in the vertical and horizontal directions, and a floating object (floating stage object FS2) for which a limit load is set in the downward direction of the virtual space and which can be moved in the vertical and horizontal directions. The form of the movement control in each direction of a floating object is not limited to these examples. As a first example, a limit load may be set in at least the downward direction along the vertical direction of the virtual space, and which can be moved in the vertical direction, but not in the horizontal direction. As a second example, a floating object may be provided for which a limit load is set in each direction along the vertical direction of the virtual space, and which can be moved in the vertical and horizontal directions. As a third example, a floating object may be provided for which a limit load is set in each of the downward and horizontal directions of the virtual space, and which can be moved in the downward and horizontal directions, but not in the upward direction. As a fourth example, a floating object may be provided for which a limit load is set in the downward direction of the virtual space, and which can be moved in the downward direction, but neither in the upward direction nor in the horizontal direction.

In addition, in the foregoing description, the floating stone object FS1 and the floating stage object FS2 have been described as an example of a floating object. Floating objects may have other disc shapes, or may be in other forms. For example, floating objects may be in the shape of a sheet such as a thick woven or net object, may be a floating cloud-like object formed by a group of water or ice droplets, or may be a three-dimensional object made of a rigid or soft body in various three-dimensional or complicated shapes.

In addition, a power source of an object that applies a thrust to a floating object is not limited to rockets. For example, such a power source may be a power source that moves forward by driving a propeller, a power source that provides a thrust due to elasticity, a power source that provides a thrust due to magnetic force or buoyancy, a power source that provides a thrust by blowing compressed gas, a character that provides a thrust by performing an action for moving a floating object (throwing, kicking, hitting, pushing, pulling, lifting, or the like).

In addition, the load applied to a floating object and the counter force applied to a floating object may be calculated by other methods. For example, the load applied to a floating object and the counter force applied to a floating object may be calculated based on the motion (speed, acceleration, angular speed, angular acceleration, or the like) of the floating object due to the application of the load. In addition, the load applied to a floating object and the counter force applied to a floating object may be calculated by calculating the total sum of the loads applied to the floating object by objects (e.g., objects placed on the floating object) interacting with the floating object.

In addition, in the above examples, it has been assumed that the self-weight of a floating object is zero. Alternatively, the self-weight may be set to a predetermined weight. As an example, the counter force for returning the movement and action of a floating object due to the self-weight to the position and orientation before the movement, may be invariably applied to the floating object so that the floating object stays or floats in the air. In that case, the limit load set for the floating object may be set to less than the self-weight of the floating object.

In addition, in the foregoing description, a force for returning a floating object to the position and orientation stored in the previous process (process for the previous frame) is calculated as the counter force. In another example, a force for returning a floating object to the position and orientation stored in a process before the previous process (process for the second previous frame or more previous frame) may be calculated as the counter force. In that case, the history of the position and orientation of a floating object may be stored from the second previous frame or more previous frame, and the counter force may be calculated using the history.

Figure 21:
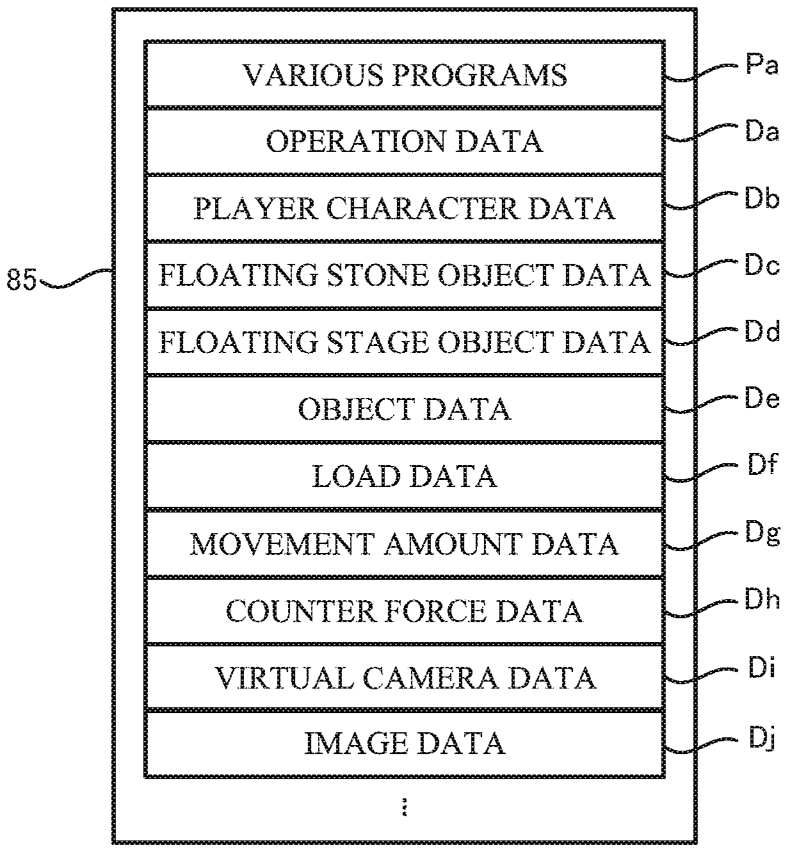
FIG. 21 is a diagram illustrating a non-limiting example of a data area set in a DRAM 85 of a main body apparatus 2.

Next, an example of a specific process that is executed in the game system 1 will be described with reference to FIG. 21. FIG. 21 is a diagram illustrating an example of a data area set in the DRAM 85 of the main body apparatus 2. It should be noted that in addition to the data of FIG. 21, the DRAM 85 also stores data used in other processes, which will not be described in detail.

Various programs Pa that are executed in the game system 1 are stored in a program storage area of the DRAM 85. In the present example, the programs Pa include an application program (e.g., a game program) for performing information processing based on data obtained from the left controller 3 and/or the right controller 4 and the main body apparatus 2, and the like. Note that the programs Pa may be previously stored in the flash memory 84, may be obtained from a storage medium removably attached to the game system 1 (e.g., a predetermined type of storage medium attached to the slot 23) and then stored in the DRAM 85, or may be obtained from another apparatus via a network, such as the Internet, and then stored in the DRAM 85. The processor 81 executes the programs Pa stored in the DRAM 85.

In addition, the data storage area of the DRAM 85 stores various kinds of data that are used in processes that are executed in the game system 1 such as information processes. In the present example, the DRAM 85 stores operation data Da, player character data Db, floating stone object data Dc, floating stage object data Dd, object data De, load data Df, movement amount data Dg, counter force data Dh, virtual camera data Di, image data Dj, and the like.

The operation data Da is obtained, as appropriate, from each of the left controller 3 and/or the right controller 4 and the main body apparatus 2. As described above, the operation data obtained from each of the left controller 3 and/or the right controller 4 and the main body apparatus 2 includes information about an input from each input section (specifically, each button, an analog stick, or a touch panel) (specifically, information about an operation). In the present example, operation data is obtained from each of the left controller 3 and/or the right controller 4 and the main body apparatus 2. The obtained operation data is used to update the operation data Da as appropriate. It should be noted that the operation data Da may be updated for each frame that is the cycle of a process executed in the game system 1, or may be updated each time operation data is obtained.

The player character data Db indicates the location, direction, and pose, and an action and state (including movement parameters such as a movement speed) in the virtual space, of the player character PC located in the virtual space, and the like.

The floating stone object data Dc indicates the location, direction, and orientation, movement and state in the virtual space (including parameters such as a speed, acceleration, angular speed, and angular acceleration), and the like of each floating stone object disposed in the virtual space.

The floating stage object data Dd indicates the location, direction, and orientation, movement and state in the virtual space (including parameters such as a speed, acceleration, angular speed, and angular acceleration), and the like of each floating stage object disposed in the virtual space.

The object data De indicates the location, direction, and orientation, movement and state in the virtual space (including parameters such as a speed, acceleration, angular speed, and angular acceleration), and the like of each object disposed in the virtual space.

The load data Df indicates a load (excluding counter forces) applied to each character (a player character PC) or object (a floating stone object or a floating stage object) disposed in the virtual space, and a load that one object applies to another object.

The movement amount data Dg indicates a movement amount of each of floating stone objects and floating stage objects disposed in the virtual space.

The counter force data Dh indicates a counter force in the Y direction and a counter force in the XZ direction set for each of floating stone objects and floating stage objects disposed in the virtual space.

The virtual camera data Di indicates the location, direction, angle of view, and the like of a virtual camera disposed in the virtual space.

The image data Dj is for displaying an image (e.g., an image of a player character PC, an image of each object, an image of another character, an image of a field of the virtual space, and a background image) on a display screen (e.g., the display 12 of the main body apparatus 2).

Figure 22:
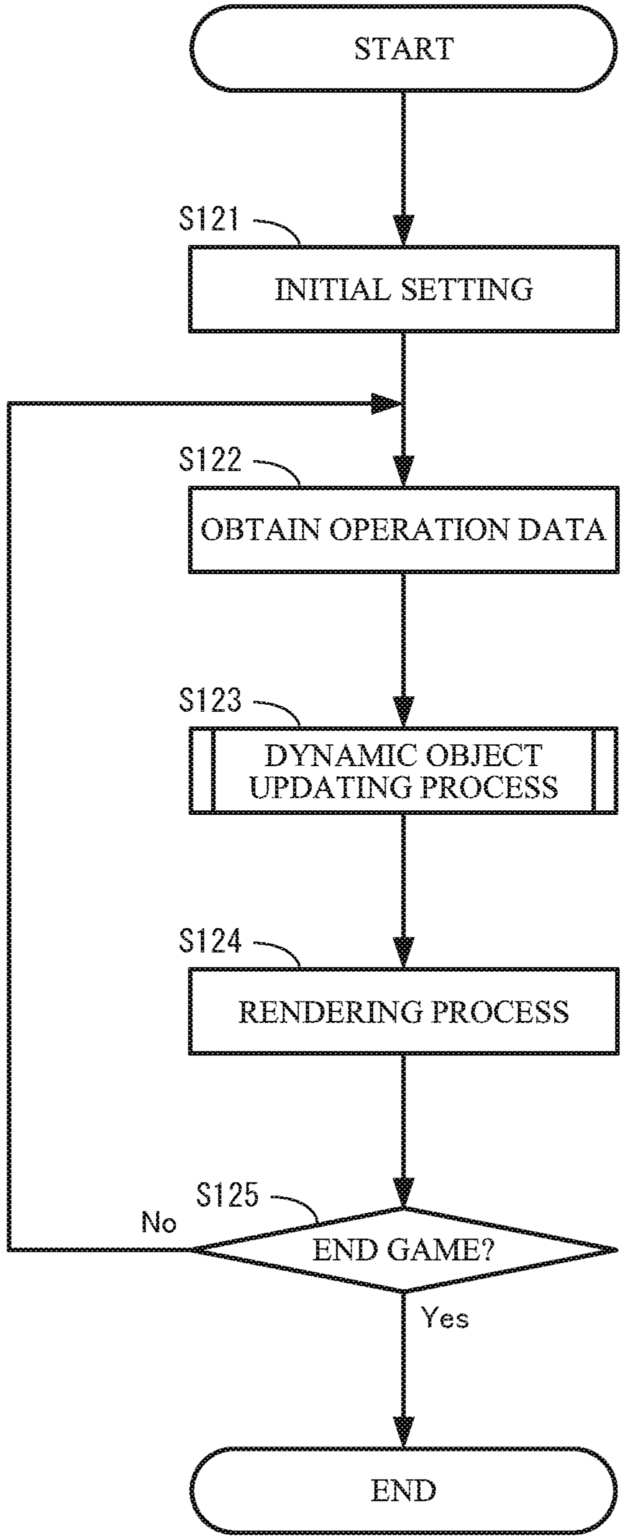
FIG. 22 is a flowchart illustrating a non-limiting example of a game process that is executed in a game system 1.
Figure 23:
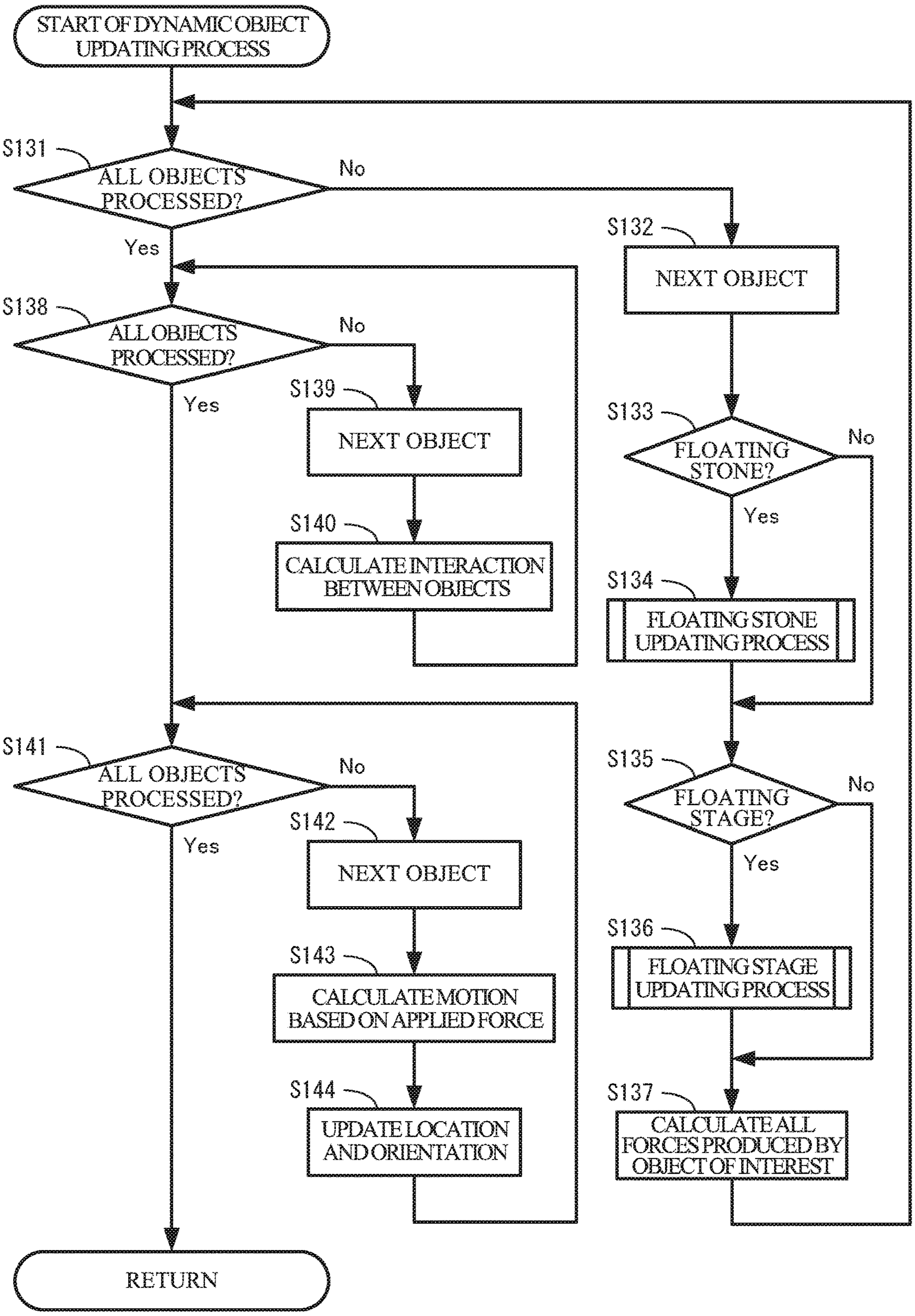
FIG. 23 is a subroutine illustrating a non-limiting example of a dynamic object updating process in step S123 of FIG. 22.
Figure 24:
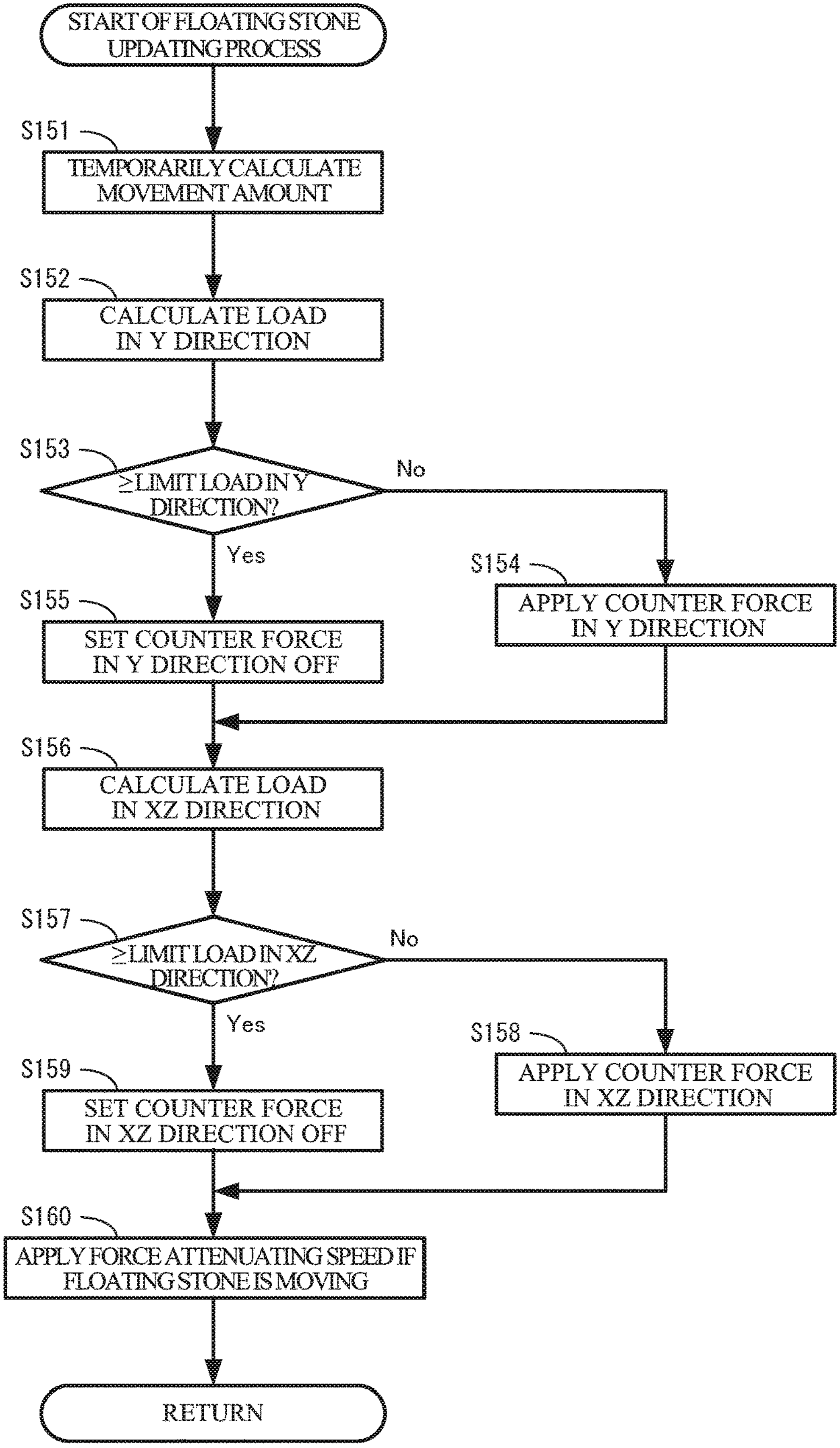
FIG. 24 is a subroutine illustrating a non-limiting example of a floating stone updating process in step S134 of FIG. 23.
Figure 25:
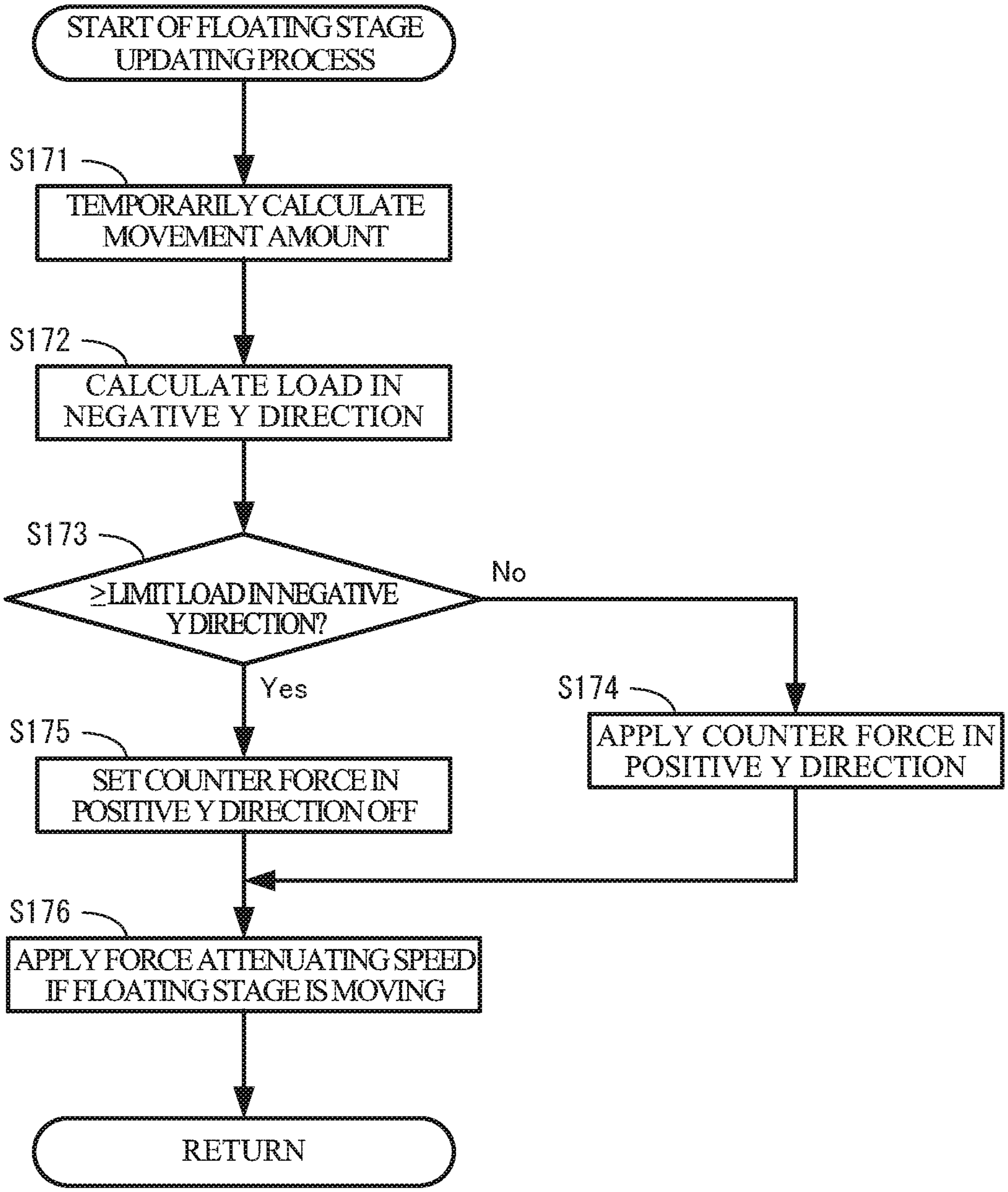
FIG. 25 is a subroutine illustrating a non-limiting example of a floating stage updating process in step S136 of FIG. 23.

Next, a detailed example of a game process that is an example of an information process in the present example will be described with reference to FIGS. 22 to 25. FIG. 22 is a flowchart illustrating an example of a game process that is executed in the game system 1. FIG. 23 is a subroutine illustrating an example of a dynamic object updating process in step S123 of FIG. 22. FIG. 24 is a subroutine illustrating an example of a floating stone updating process in step S134 of FIG. 23. FIG. 25 is a subroutine illustrating an example of a floating stage updating process in step S136 of FIG. 23. In the present example, a series of steps illustrated in FIGS. 22 to 25 are executed by the processor 81 executing a predetermined application program (game program) included the programs Pa. The game process of FIGS. 22 to 25 is started with any appropriate timing.

It should be noted that the steps in the flowcharts of FIGS. 22 to 25, which are merely illustrative, may be executed in a different order, or another step may be executed in addition to (or instead of) each step, if a similar effect is obtained. In the present example, it is assumed that the processor 81 executes each step of the flowcharts. Alternatively, a portion of the steps of the flowcharts may be executed by a processor or dedicated circuit other than the processor 81. In addition, a portion of the steps executed by the main body apparatus 2 may be executed by another information processing apparatus that can communicate with the main body apparatus 2 (e.g., a server that can communicate with the main body apparatus 2 via a network). Specifically, the steps of FIGS. 22 to 25 may be executed by a plurality of information processing apparatuses including the main body apparatus 2 cooperating with each other.

In FIG. 22, the processor 81 executes initial setting for the game process (step S121), and proceeds to the next step. For example, in the initial setting, the processor 81 initializes parameters for executing steps described below, and updates each data. As an example, the processor 81 disposes objects, characters, and the like in a game field of the virtual space to generate an initial state of the virtual space, and updates the floating stone object data Dc, the floating stage object data Dd, and the object data D3. In addition, the processor 81 disposes a player character PC and a virtual camera in a predetermined pose and orientation at default locations in the virtual space in the initial state, and updates the player character data Db and the virtual camera data Di.

Next, the processor 81 obtains operation data from the left controller 3, the right controller 4, and/or the main body apparatus 2, updates the operation data Da (step S122), and proceeds to the next step.

Next, the processor 81 executes a dynamic object updating process (step S123), and proceeds to step S124. The dynamic object updating process in step S123 will be described below with reference to FIG. 23.

In FIG. 23, the processor 81 determines whether or not steps S132 to S137 have been executed for all dynamic objects disposed in the virtual space (step S131). Here, examples of dynamic objects processed in step S123, which are movable in the virtual space, include objects disposed in the virtual space including floating objects such as the floating stone object FS1 and the floating stage object FS2, an assembly object obtained by joining a plurality of objects together, a player character PC, a non-player character such as an opponent character, item objects disposed in the virtual space, and the like. If steps S132 to S137 have not been executed for all dynamic objects, the processor 81 proceeds to step S132. Otherwise, i.e., if steps S132 to S137 have been executed for all dynamic objects, the processor 81 proceeds to step S138.

In step S132, the processor 81 chooses a dynamic object for which steps S133 to S137 have not been executed from all dynamic objects disposed in the virtual space, and proceeds to the next step.

Next, the processor 81 determines whether or not the dynamic object is a floating stone object FS1 (see FIGS. 8 to 17) (a dynamic object of interest in step S133). If the dynamic object of interest is a floating stone object FS1, the processor 81 proceeds to step S134. Otherwise, i.e., if the dynamic object of interest is not a floating stone object FS1, the processor 81 proceeds to step S135.

In step S134, the processor 81 executes a floating stone updating process, and proceeds to the next step, i.e., step S135. The floating stone updating process will be described below with reference to FIG. 24.

In FIG. 24, the processor 81 temporarily calculates the movement amount of the floating stone object FS1 of interest (step S151), and proceeds to the next step. For example, the processor 81 calculates the movement (movement speed, movement acceleration, movement angular speed, movement angular acceleration, movement direction, or the like) of the floating stone object FS1 of interest, by physical calculation based on a force applied to said floating stone object FS1 (a load produced by a weight or thrust or a thrust during movement), a collision between said floating stone object FS1 and another object, or the like, with reference to the floating stone object data Dc, the load data Df, and the counter force data Dh of said floating stone object FS1, and temporarily calculates the position and orientation of said floating stone object FS1 after the movement. Thereafter, the processor 81 retrieves, from the floating stone object data Dc, the position and orientation of the floating stone object FS1 of interest set in the previous process (process for the previous frame), temporarily calculates the difference between the retrieved position and orientation of said floating stone object FS1 and the temporarily calculated position and orientation of said floating stone object FS1 in the vertical direction (Y direction), i.e., the movement amount in the Y direction of said floating stone object FS1, and updates the movement amount data Dg related to said floating stone object FS1.

Next, the processor 81 calculates the load applied to the floating stone object FS1 of interest in the vertical direction (Y direction) (step S152), and proceeds to the next step. For example, the processor 81 calculates a force in the Y direction for producing the movement amount of the floating stone object FS1 of interest that has been temporarily calculated in step S151, based on physical calculation. Thereafter, the processor 81 retrieves, from the counter force data Dh, to obtain a counter force in the Y direction that has been applied to the floating stone object FS1 of interest in the previous process (process for the previous frame), and subtracts the counter force from the calculated force in the Y direction, to calculate the load applied to said floating stone object FS1 in the Y direction.

Next, the processor 81 determines whether or not the load in the Y direction calculated in step S152 is greater than or equal to the limit load in the Y direction set for the floating stone object FS1 of interest (step S153). If the load in the Y direction is smaller than the limit load, the processor 81 proceeds to step S154. Otherwise, i.e., if the load in the Y direction is greater than or equal to the limit load, the processor 81 proceeds to step S155.

In step S154, the processor 81 applies the counter force to the floating stone object FS1 of interest in the Y direction, and proceeds to step S156. For example, the processor 81 further applies a force for returning the floating stone object FS1 of interest from the position and orientation of said floating stone object FS1 temporarily calculated in step S151 to the position and orientation of said floating stone object FS1 that have been set in the previous process (process for the previous frame), in the Y direction, to the floating stone object FS1, and updates the counter force in the Y direction of said floating stone object FS1 in the counter force data Dh.

In step S155, the processor 81 sets "off" (remove) the counter force applied to the floating stone object FS1 of interest in the Y direction, and proceeds to step S156. For example, the processor 81 removes the counter force applied to the floating stone object FS1 of interest in the Y direction, and updates the counter force applied to said floating stone object FS1 in the Y direction in the counter force data Dh.

In step S156, the processor 81 calculates the load applied to the floating stone object FS1 of interest in the horizontal direction (XZ direction), and proceeds to the next step. For example, the processor 81 calculates, based on physical calculation, a force in the XZ direction that produces the movement amount of the floating stone object FS1 of interest in the XZ direction temporarily calculated in step S151. Thereafter, the processor 81 retrieves, from the counter force data Dh, the counter force applied to the floating stone object FS1 of interest in the XZ direction in the previous process (process for the previous frame), and subtracts said counter force from the calculated force in the XZ direction, to calculate the load applied to the floating stone object FS1 in the XZ direction.

Next, the processor 81 determines whether or not the load in the XZ direction calculated in step S156 is greater than or equal to the limit load in the XZ direction of the floating stone object FS1 of interest (step S157). If the load in the XZ direction is smaller than the limit load, the processor 81 proceeds to step S158. Otherwise, i.e., if the load in the XZ direction is greater than or equal to the limit load, the processor 81 proceeds to step S159.

In step S158, the processor 81 applies the counter force to the floating stone object FS1 of interest in the XZ direction, and proceeds to step S160. For example, the processor 81 calculates a force for returning the floating stone object FS1 of interest from the position and orientation of said floating stone object FS1 temporarily calculated in step S151 to the position and orientation of said floating stone object FS1 calculated in the previous process (process for the previous frame), in the XZ direction, further adds the force to said floating stone object FS1, and updates the counter force in the XZ direction of said floating stone object FS1 in the counter force data Dh.

In step S159, the processor 81 sets "off" (remove) the counter force applied to the floating stone object FS1 of interest in the XZ direction, and proceeds to step S160. For example, the processor 81 removes the counter force applied to the floating stone object FS1 of interest in the XZ direction, and updates the counter force applied to said floating stone object FS1 in the XZ direction in the counter force data Dh.

In step S160, when the floating stone object FS1 of interest is moving, the processor 81 applies a force that attenuates the movement speed to said floating stone object FS1, updates the load data Df, and ends the subroutine. For example, the processor 81 applies a force that produces an attenuation such that the movement speed of the floating stone object FS1 of interest is multiplied by a value of less than one or a force that produces an attenuation such that a predetermined value is subtracted from the movement speed, to said floating stone object FS1, and updates the load data Df. It should be noted that the force that attenuates the movement speed of a floating stone object FS1 may vary depending on the movement direction. For example, the force that attenuates the movement speed may attenuate the component in the negative Y direction, the component in the positive Y direction, and the component in the XZ direction of the movement speed to different extents.

Referring back to FIG. 23, the processor 81 determines whether or not the dynamic object of interest is a floating stage object FS2 (see FIGS. 18 and 19) (step S135). If the dynamic object of interest is a floating stage object FS2, the processor 81 proceeds to step S136. Otherwise, i.e., if the dynamic object of interest is a floating stage object FS2, the processor 81 proceeds to step S137.

In step S136, the processor 81 executes a floating stage updating process, and proceeds to the next step, i.e., step S137. The floating stage updating process in step S136 will be described below with reference to FIG. 25.

In FIG. 25, the processor 81 temporarily calculates the movement amount of the floating stage object FS2 of interest (step S171), and proceeds to the next step. For example, the processor 81 calculates the movement (movement speed, movement acceleration, movement angular speed, movement angular acceleration, movement direction, or the like) of the floating stage object FS2 of interest, by physical calculation based on a force applied to said floating stage object FS2 (a load produced by a weight or thrust or a thrust during movement), a collision between said floating stage object FS2 and another object, or the like, with reference to the floating stage object data Dd, the load data Df, and the counter force data Dh of said floating stage object FS2, and temporarily calculates the position and orientation of said floating stage object FS2 after the movement. Thereafter, the processor 81 retrieves, from the floating stage object data Dd, the position and orientation of the floating stage object FS2 of interest set in the previous process (process for the previous frame), temporarily calculates the difference between the retrieved position and orientation of said floating stage object FS2 and the temporarily calculated position and orientation of said floating stage object FS2 in the vertical direction (Y direction), i.e., the movement amount in the Y direction of said floating stage object FS2, and updates the movement amount data Dg related to said floating stage object FS2.

Next, the processor 81 calculates a load applied to the floating stage object FS2 of interest in the downward direction (negative Y direction) (step S172), and proceeds to the next step. For example, if the movement amount temporarily calculated in step S171 includes a component of movement in the negative Y direction, the processor 81 calculates a force in the negative Y direction that produces a movement amount of the floating stage object FS2 of interest in the negative Y direction, based on physical calculation. Thereafter, the processor 81 retrieves, from the counter force data Dh, the counter force applied to the floating stage object FS2 in the positive Y direction in the previous process (process for the previous frame), subtracts the counter force from the calculated force in the negative Y direction, to calculate the load in the negative Y direction applied to said floating stage object FS2.

Next, the processor 81 determines whether or not the load in the negative Y direction calculated in step S172 is greater than or equal to the limit load in the negative Y direction set for the floating stage object FS2 of interest (step S173). If the load in the negative Y direction is smaller than the limit load, the processor 81 proceeds to step S174. Otherwise, i.e., if the load in the negative Y direction is greater than or equal to the limit load, the processor 81 proceeds to step S175.

In step S174, the processor 81 applies the counter force to the floating stage object FS2 of interest in the negative Y direction, and proceeds to step S176. For example, the processor 81 further applies the counter force for returning the floating stage object FS2 of interest from the position and orientation of said floating stage object FS2 temporarily calculated in step S171 to the position and orientation of said floating stage object FS2 that have been set in the previous process (process for the previous frame), in the Y direction, to said floating stage object FS2, and updates the counter force in the positive Y direction of said floating stage object FS2 in the counter force data Dh.

In step S175, the processor 81 sets "off" (remove) the counter force applied to the floating stage object FS2 of interest in the positive Y direction, and proceeds to step S176. For example, the processor 81 removes the counter force applied to the floating stage object FS2 of interest in the positive Y direction, and updates the counter force applied to said floating stage object FS2 in the positive Y direction in the counter force data Dh.

In step S176, when the floating stage object FS2 of interest is moving, the processor 81 applies a force that attenuates the movement speed to the floating stage object FS2, updates the load data Df, and ends the subroutine. For example, the processor 81 applies a force that produces an attenuation such that the movement speed of the floating stage object FS2 of interest is multiplied by a value of less than one or a force that produces an attenuation such that a predetermined value is subtracted from the movement speed, to said floating stage object FS2, and updates the load data Df. It should be noted that the force that attenuates the movement speed of a floating stage object FS2 may vary depending on the movement direction. For example, the force that attenuates the movement speed may attenuate the component in the negative Y direction, the component in the positive Y direction, and the component in the XZ direction of the movement speed to different extents.

Referring back to FIG. 23, in step S137, the processor 81 calculates all forces that are produced by a dynamic object of interest, and returns to and repeats step S131. For example, the processor 81 calculates all forces that are produced by a dynamic object of interest in the virtual space by physical calculation, and updates the load data Df. Here, forces that are produced by a dynamic object include various forces that are produced due to the dynamic object's actions and movements and forces that are received by the dynamic object from other objects around the dynamic object in the virtual space, particularly including inertial forces due to movement, action, and vibration, stress and scattering forces related to damage to at least a portion of the dynamic object, gravity produced by the self-weight of the dynamic object, pressure caused by various phenomena occurring in the virtual space (excluding interactions with other objects), and the like in the virtual space.

If in step S131 it is determined that steps S132 to S137 have been executed for all dynamic objects, the processor 81 determines whether or not steps S139 and S140 have been executed for all dynamic objects disposed in the virtual space (step S138). If steps S139 and S140 have not been executed for all the dynamic objects, the processor 81 proceeds to step S139. Otherwise, i.e., if steps S139 and S140 have been executed for all the dynamic objects, the processor 81 proceeds to step S141.

In step S139, the processor 81 chooses a dynamic object for which step S140 has not been executed, from all dynamic objects disposed in the virtual space, and proceeds to the next step.

Next, the processor 81 calculates an interaction between the dynamic object of interest and another object (step S140), and returns to and repeats step S138. For example, the processor 81 calculates an interaction in which objects affect each other or apply a force to each other, so that states of motions thereof are changed, by physical determination, calculates a force applied to the dynamic object of interest by physical calculation based on the states of motions changed due to the interaction, and updates the load data Df of said dynamic object. Examples of forces calculated from an interaction with other objects include a force received due to another object's attack, a repulsive force due to attack on another object, an impact or frictional force due to impact or contact with another object, a field, or the like, a thrust received due to pushing, pulling, lifting or the like performed by another object, gravity produced by the weight of another object that is in contact therewith, stress received from another object joined and integrated therewith, and the like.

If in step S138 it is determined that steps S139 and S140 have been executed for all dynamic objects, the processor 81 determines whether or not steps S142 to S144 have been executed for all dynamic objects disposed in the virtual space (step S141). If steps S142 to S144 have not been executed for all the dynamic objects, the processor 81 proceeds to step S142. Otherwise, i.e., if steps S142 to S144 have been executed for all the dynamic objects, the processor 81 ends the subroutine.

In step S142, the processor 81 chooses a dynamic object for which steps S143 and S144 have not been executed, from all dynamic objects disposed in the virtual space, and proceeds to the next step.

Next, the processor 81 calculates a motion of the dynamic object of interest based on a force applied to said dynamic object (step S143), and proceeds to the next step. For example, the processor 81 calculates a motion parameter (speed, acceleration, angular speed, angular acceleration, or the like) of the dynamic object of interest due to the influence (physical determination) of a force applied to said dynamic object (including a counter force) with reference to the load data Df and the counter force data Dh of said dynamic object, and updates the player character data Db, the floating stone object data Dc, the floating stage object data Dd, or the object data De. It should be noted that if a motion parameter has been calculated for each force, these motion parameters are cancelled each other out or added up to obtain a single motion parameter for the dynamic object of interest.

The calculation of a motion of a dynamic object in step S143 is also based on setting of the player character PC's action based on the user's operation input or another character's action. As an example, if the player character PC is to be processed, the processor 81 sets the pose, action, state, and the like of the player character PC based on the user's operation input indicated by the operation data Da, virtual physical calculation (e.g., a virtual inertia or gravity) in the virtual space, and the like, and updates the player character data Db.

Next, the processor 81 updates the location and orientation of the dynamic object of interest in the virtual space (step S144), and returns to and repeats step S141. For example, the processor 81 retrieves the location, direction, orientation, and motion parameter of the dynamic object of interest in the virtual space, from the player character data Db, the floating stone object data Dc, the floating stage object data Dd, or the object data Dd. Thereafter, the processor 81 executes physical calculation based on the retrieved dynamic parameters to move the dynamic object of interest in the virtual space, and updates the player character data Db, the floating stone object data Dc, the floating stage object data Dd, or the object data Dd using the location, direction, and orientation after the movement.

Referring back to FIG. 22, after the dynamic object updating process in step S123, the processor 81 executes a rendering process (step S127), and proceeds to the next step. For example, the processor 81 disposes the player character PC, objects, and the like in the virtual space based on the player character data Db, the floating stone object data Dc, the floating stage object data Dd, and the object data Dd. In addition, the processor 81 sets the location and/or orientation of a virtual camera for generating a display image based on the virtual camera data Di, to dispose the virtual camera in the virtual space. Thereafter, the processor generates an image of the virtual space as viewed from the set virtual camera, and executes control such that the virtual space image is displayed on the display 12. It should be noted that the processor 81 may execute a process of controlling the movement of the virtual camera in the virtual space based on the location and pose of the player character PC, and updates the virtual camera data Di. In addition, the processor 81 may move the virtual camera in the virtual space based on the operation data Da, and update the virtual camera data Di.

Next, the processor 81 determines whether or not to end the game process (step S125). In step S125, the game process is ended, for example, if a condition for ending the game process is satisfied, the user has performed an operation of ending the game process, or the like. If the processor 81 determines not to end the game process, the processor 81 returns to and repeats step S122. Otherwise, i.e., if the processor 81 determines to end the game process, the processor 81 ends the flowchart. Following this, steps S122 to S125 are repeatedly executed until the processor 81 determines to end the game process in step S125.

Thus, in the present example, the floating stone object FS1 or the floating stage object FS2 can be implemented such that when a load that does not exceed the limit load is applied to the floating stone object FS1 or the floating stage object FS2, the floating stone object FS1 or the floating stage object FS2 can act to float at the current position in the air of the virtual space, and can also be moved from the current position.

The game system 1 may be any suitable apparatus, including handheld game apparatuses, personal digital assistants (PDAs), mobile telephones, personal computers, cameras, tablet computers, and the like.

In the foregoing, the information process (game process) is performed in the game system 1 by way of example. Alternatively, at least a portion of the process steps may be performed in another apparatus. For example, when the game system 1 can also communicate with another apparatus (e.g., a server, another information processing apparatus, another image display apparatus, another game apparatus, another mobile terminal, etc.), the process steps may be executed in cooperation with the second apparatus. By thus causing another apparatus to perform a portion of the process steps, a process similar to the above process can be performed. The above information process may be executed by a single processor or a plurality of cooperating processors included in an information processing system including at least one information processing apparatus. In the above example, the information processes can be performed by the processor 81 of the game system 1 executing predetermined programs. Alternatively, all or a portion of the above processes may be performed by a dedicated circuit included in the game system 1.

Here, according to the above variation, the present example can be implanted in a so-called cloud computing system form or distributed wide-area and local-area network system forms. For example, in a distributed local-area network system, the above process can be executed by cooperation between a stationary information processing apparatus (a stationary game apparatus) and a mobile information processing apparatus (handheld game apparatus). It should be noted that, in these system forms, each of step S may be performed by substantially any of the apparatuses, and the present example may be implemented by assigning the steps to the apparatuses in substantially any manner.

The order of steps, setting values, conditions for determination, etc., used in the above information process are merely illustrative, and of course, other order of steps, setting values, conditions for determination, etc., may be used to implement the present example.

The above programs may be supplied to the game system 1 not only through an external storage medium, such as an external memory, but also through a wired or wireless communication line. The program may be previously stored in a non-volatile storage device in the game system 1. Examples of an information storage medium storing the program include non-volatile memories, and in addition, CD-ROMs, DVDs, optical disc-like storage media similar thereto, and flexible disks, hard disks, magneto-optical disks, and magnetic tapes. The information storage medium storing the program may be a volatile memory storing the program. Such a storage medium may be said as a storage medium that can be read by a computer, etc. (computer-readable storage medium, etc.). For example, the above various functions can be provided by causing a computer, etc., to read and execute programs from these storage media.

While several example systems, methods, devices, and apparatuses have been described above in detail, the foregoing description is in all aspects illustrative and not restrictive. It should be understood that numerous other modifications and variations can be devised without departing from the spirit and scope of the appended claims. It is, therefore, intended that the scope of the present technology is limited only by the appended claims and equivalents thereof. It should be understood that those skilled in the art could carry out the literal and equivalent scope of the appended claims based on the description of the present example and common technical knowledge. It should be understood throughout the present specification that expression of a singular form includes the concept of its plurality unless otherwise mentioned. Specifically, articles or adjectives for a singular form (e.g., "a", "an", "the", etc., in English) include the concept of their plurality unless otherwise mentioned. It should also be understood that the terms as used herein have definitions typically used in the art unless otherwise mentioned. Thus, unless otherwise defined, all scientific and technical terms have the same meanings as those generally used by those skilled in the art to which the present example pertain. If there is any inconsistency or conflict, the present specification (including the definitions) shall prevail.

As described above, the present example can be used as a game program, game system, game apparatus, game processing method, and the like in which what can be performed in the air of a virtual space can be increased.

What is claimed is:

1. A non-transitory computer-readable storage medium having stored therein instructions that, when executed, cause one or more processors of an information processing apparatus to execute game processing comprising:

for at least one floating object disposed in the air, of dynamic objects disposed in a virtual space, movements of the dynamic objects being controlled based on physical calculation, calculating a load applied to the floating object based on a game process:

in a first case in which the load does not exceed a first limit load in a first direction including at least a downward direction in the virtual space, additionally applying a first force that maintains a position of the floating object in the virtual space, to the floating object:

in a second case in which the load exceeds the first limit load in the first direction, removing the first force; and updating the position and an orientation of the floating object based on the physical calculation.

2. The non-transitory computer-readable storage medium according to claim 1, wherein the game processing further comprises:

storing the position and orientation of the floating object updated based on the physical calculation; and in the first case, applying a force that returns the floating object from the position and orientation of the floating object that are taken when the floating object is moved based on the load without the first force being applied to the floating object to the immediately previously stored position and orientation, as the first force, to the floating object.

3. The non-transitory computer-readable storage medium according to claim 1, wherein the first direction is a vertical direction in the virtual space.

4. The non-transitory computer-readable storage medium according to claim 3, wherein the first force maintains a position of the floating object related to the vertical direction.

5. The non-transitory computer-readable storage medium according to claim 4, wherein the game processing further comprises:

in a third case in which the load does not exceed a second limit load in a second direction along a horizontal direction in the virtual space, additionally applying a second force that maintains a position of the floating object related to the horizontal direction in the virtual space, to the floating object; and in a fourth case in which the load exceeds the second limit load in the second direction, removing the second force.

6. The non-transitory computer-readable storage medium according to claim 3, wherein the load includes a load in a gravitational direction of the virtual space based on a weight of the dynamic object placed on the floating object based on the game process, and a thrust applied to the floating object based on contact from the dynamic object that produces a thrust in a direction.

7. The non-transitory computer-readable storage medium according to claim 6, wherein the game processing further comprises:

controlling a player character in the virtual space based on an operation input, and the load includes a load in the gravitational direction based on a weight of the player character when the player character is placed on the floating object.

8. The non-transitory computer-readable storage medium according to claim 3, wherein the game processing further comprises:

when the floating object moves based on the physical calculation, producing a force that attenuates a movement speed of the movement to control the movement speed of the floating object.

9. A game system comprising:

one or more processors; and one or more memories storing instructions that, when executed, cause the game system to perform operations including:

for at least one floating object disposed in the air, of dynamic objects disposed in a virtual space, movements of the dynamic objects being controlled based on physical calculation, calculating a load applied to the floating object based on a game process:

in a first case in which the load does not exceed a first limit load in a first direction including at least a downward direction in the virtual space, additionally applying a first force that maintains a position of the floating object in the virtual space, to the floating object;

in a second case in which the load exceeds the first limit load in the first direction, removing the first force; and updating the position and an orientation of the floating object based on the physical calculation.

10. The game system according to claim 9, wherein the position and orientation of the floating object updated based on the physical calculation are stored, and in the first case, a force that returns the floating object from the position and orientation of the floating object that are taken when the floating object is moved based on the load without the first force being applied to the floating object to the immediately previously stored position and orientation, is applied as the first force to the floating object.

11. The game system according to claim 9, wherein the first direction is a vertical direction in the virtual space.

12. The game system according to claim 11, wherein the first force maintains a position of the floating object related to the vertical direction.

13. The game system according to claim 12, wherein in a third case in which the load does not exceed a second limit load in a second direction along a horizontal direction in the virtual space, a second force that maintains a position of the floating object related to the horizontal direction in the virtual space, is additionally applied to the floating object, and in a fourth case in which the load exceeds the second limit load in the second direction, the second force is removed.

14. The game system according to claim 11, wherein the load includes a load in a gravitational direction of the virtual space based on a weight of the dynamic object placed on the floating object based on the game process, and a thrust applied to the floating object based on contact from the dynamic object that produces a thrust in a direction.

15. The game system according to claim 14, wherein further, a player character in the virtual space is controlled based on an operation input, and the load includes a load in the gravitational direction based on a weight of the player character when the player character is placed on the floating object.

16. The game system according to claim 11, wherein further, when the floating object moves based on the physical calculation, a force that attenuates a movement speed of the movement is produced to control the movement speed of the floating object.

17. A game apparatus comprising:

one or more processors; and one or more memories storing instructions that, when executed, cause the game apparatus to perform operations including:

for at least one floating object disposed in the air, of dynamic objects disposed in a virtual space, movements of the dynamic objects being controlled based on physical calculation, calculating a load applied to the floating object based on a game process:

in a first case in which the load does not exceed a first limit load in a first direction including at least a downward direction in the virtual space, additionally applying a first force that maintains a position of the floating object in the virtual space, to the floating object:

in a second case in which the load exceeds the first limit load in the first direction, removing the first force; and updating the position and an orientation of the floating object based on the physical calculation.

18. The game apparatus according to claim 17, wherein the position and orientation of the floating object updated based on the physical calculation are stored, and in the first case, a force that returns the floating object from the position and orientation of the floating object that are taken when the floating object is moved based on the load without the first force being applied to the floating object to the immediately previously stored position and orientation, is applied as the first force to the floating object.

19. A game processing method for causing one or more processors of an information processing system to at least:

for at least one floating object disposed in the air, of dynamic objects disposed in a virtual space, movements of the dynamic objects being controlled based on physical calculation, calculate a load applied to the floating object based on a game process:

in a first case in which the load does not exceed a first limit load in a first direction including at least a downward direction in the virtual space, additionally apply a first force that maintains a position of the floating object in the virtual space, to the floating object:

in a second case in which the load exceeds the first limit load in the first direction, remove the first force; and update the position and an orientation of the floating object based on the physical calculation.

20. The game processing method according to claim 19, wherein the position and orientation of the floating object updated based on the physical calculation are stored, and in the first case, a force that returns the floating object from the position and orientation of the floating object that are taken when the floating object is moved based on the load without the first force being applied to the floating object to the immediately previously stored position and orientation, is applied as the first force to the floating object.

* * * * *